United States Patent
Iwata

(10) Patent No.: US 11,911,700 B2
(45) Date of Patent: Feb. 27, 2024

(54) SPORT GAME SYSTEM, COMPUTER-READABLE NON-TRANSITORY STORAGE MEDIUM HAVING STORED THEREIN SPORT GAME PROGRAM, SPORT GAME APPARATUS, AND SPORT GAME PROCESSING METHOD

(71) Applicant: NINTENDO CO., LTD., Kyoto (JP)

(72) Inventor: Kenji Iwata, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 17/859,571

(22) Filed: Jul. 7, 2022

(65) Prior Publication Data
US 2023/0023905 A1    Jan. 26, 2023

(30) Foreign Application Priority Data

Jul. 26, 2021  (JP) .................. 2021-121893

(51) Int. Cl.
| | |
|---|---|
| A63F 13/577 | (2014.01) |
| A63F 13/573 | (2014.01) |
| A63F 13/812 | (2014.01) |
| A63F 13/211 | (2014.01) |
| A63F 13/33 | (2014.01) |
| A63F 13/5258 | (2014.01) |

(52) U.S. Cl.
CPC .......... *A63F 13/577* (2014.09); *A63F 13/211* (2014.09); *A63F 13/33* (2014.09); *A63F 13/5258* (2014.09); *A63F 13/573* (2014.09); *A63F 13/812* (2014.09)

(58) Field of Classification Search
CPC ...... A63F 13/211; A63F 13/42; A63F 13/428; A63F 13/45; A63F 13/5258; A63F 13/55; A63F 13/573; A63F 13/812
See application file for complete search history.

(56) References Cited

U.S. PATENT DOCUMENTS

| | | | |
|---|---|---|---|
| 10,201,746 B1 * | 2/2019 | Sarrafzadeh | ......... A61B 5/7264 |
| 2010/0248834 A1 | 9/2010 | Suzuki | |
| 2011/0223998 A1 | 9/2011 | Asano | |

(Continued)

FOREIGN PATENT DOCUMENTS

| | | |
|---|---|---|
| JP | 2002-282535 | 10/2002 |
| JP | 2010-119787 | 6/2010 |

(Continued)

OTHER PUBLICATIONS

Office Action dated Dec. 12, 2023 for Japanese Patent Application No. 2021-121893 (with English translation), 19 pages.

*Primary Examiner* — Omkar A Deodhar
(74) *Attorney, Agent, or Firm* — Nixon & Vanderhye, PC

(57) ABSTRACT

A player character is moved based on an operation performed on a direction input device, the position of a virtual camera is controlled based on the position of the player character, and a swing direction in which an operation device has been swung is determined based on data from an inertial sensor, and causes the player character to perform a swing action of swinging in a direction according to the swing direction. Then, a moving object is moved based on collision determination between the swing action and the moving object, thereby controlling a sport game using the moving object.

27 Claims, 24 Drawing Sheets

(56) References Cited

U.S. PATENT DOCUMENTS

| | | | |
|---|---|---|---|
| 2016/0054837 A1* | 2/2016 | Stafford | G02B 27/01 463/33 |
| 2016/0217325 A1* | 7/2016 | Bose | G11B 27/17 |
| 2018/0001192 A1* | 1/2018 | Vaughn | A63F 13/212 |
| 2019/0068945 A1* | 2/2019 | Maruyama | G06V 20/42 |

FOREIGN PATENT DOCUMENTS

| | | |
|---|---|---|
| JP | 2010-233681 | 10/2010 |
| JP | 2012-101026 | 5/2012 |
| JP | 2018-161433 | 10/2018 |

* cited by examiner

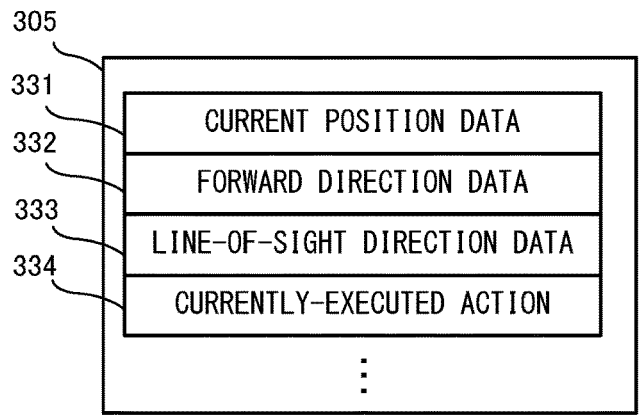

SPORT GAME SYSTEM, COMPUTER-READABLE NON-TRANSITORY STORAGE MEDIUM HAVING STORED THEREIN SPORT GAME PROGRAM, SPORT GAME APPARATUS, AND SPORT GAME PROCESSING METHOD

CROSS REFERENCE TO RELATED APPLICATION

This application claims priority to Japanese Patent Application No. 2021-121893 filed on Jul. 26, 2021, the entire contents of which are incorporated herein by reference.

FIELD

The exemplary embodiments relate to sport game processing having a motif of a ball game or the like.

BACKGROUND AND SUMMARY

To date, a competitive soccer game using a network has been known.

An operation method for the above soccer game uses a cross key, an operation key, and a joystick of a controller. Therefore, for example, an operation of causing a player character to kick a ball uses these keys and the joystick.

However, such a key operation is not sufficient for precise control, such as precisely designating a kick direction (a direction in which a leg is swung).

Therefore, an object of the exemplary embodiment is to provide a sport game system in which a user can play a sport game while directly and precisely designating a swing direction in a virtual game space.

Configuration examples for achieving the above object will be shown below.

One configuration example is a sport game system including an operation device, and an information processing apparatus including a processor. The operation device includes a first direction input device, a first inertial sensor, and a data transmission section configured to transmit operation data to the information processing apparatus, the operation data including at least first direction data based on an output of the first direction input device and first inertial data based on an output of the first inertial sensor. The processor moves a player character object in a virtual space on the basis of the first direction data, controls a position of a virtual camera in the virtual space on the basis of a position of the player character object, determines, on the basis of the first inertial data, a swing direction in which the operation device has been swung, causes the player character object to perform a swing action of swinging in a direction according to the determined swing direction, and causes the moving object to move in the virtual space on the basis of collision determination between the swing action and a moving object, thereby controlling a sport game that uses the moving object.

According to the above configuration example, an operation of moving the player character object can be performed by using the first direction input device, and furthermore, the player character object can be caused to perform a swing action by a user's operation of swinging the operation device. Moreover, the moving object can be moved based on the swing action. Thus, the user can intuitively and precisely designate the direction in which the player character object swings, by the direction in which the user swings the operation device. This also means that the user can intuitively and precisely designate the direction in which the moving object is moved. Therefore, the intuitive operation also allows an operation of moving the moving object toward an aimed position. Thus, a sport game system having excellent operability can be provided. Since the virtual camera is controlled based on the position of the player character object, the virtual camera can be controlled such that the player character object is always inside the field of view, thereby providing a screen that allows the user to easily grasp the positional relationship regarding the player character object. Moreover, since the player character object performs a swing action in accordance with the user's operation of actually swinging the operation device, the user is provided with a sense of playing the game in a more realistic way.

In another configuration example, the moving object may be a ball object.

According to the above configuration example, in the sport game system having a motif of a ball game, it is possible to provide a sport game that has excellent operability and allows the user to have a sense of playing the game in a more realistic way.

In another configuration example, the swing action may be a kick action of swinging a leg of the player character object, and the sport game may be a soccer game in which a point is given when the ball object is kicked into a goal.

According to the above configuration example, it is possible to provide a soccer game that has excellent operability and allows the user to have a sense of playing the game in a more realistic way.

In another configuration example, the processor may determine the swing direction as a two-dimensional direction, and may cause the player character object to perform, as the kick action, an action of kicking in a direction according to the two-dimensional swing direction.

According to the above configuration example, any direction can be designated as a kick direction with respect to two-dimensional 360-degree directions. Thus, a kick direction in the soccer game can be precisely and highly-flexibly designated, thereby enhancing entertainment characteristics of the soccer game.

In another configuration example, the processor may perform communication through the Internet or wireless and direct communication, with another information processing apparatus, and may control the player character together with another player character controlled in the other information processing apparatus, to control the sport game played by multiple players.

According to the above configuration example, in a team-versus-team sport game, multiple users can play the game such that each user takes charge of one of athlete characters, and precisely controls his/her own athlete character at his/her own discretion. Thus, as compared to the conventional sport game in which a user controls the whole team, it is possible to provide the user with a sense of playing the sport as if he/she participates the game as one athlete in a real sport team.

In another configuration example, the operation device may include a first operation device and a second operation device, the first operation device may include the first direction input device, and the second operation device may include the first inertial sensor.

According to the above configuration example, the user can perform, with his/her left and right hands, different operations such as operating the direction input device with the left hand while swinging the second operation device with the right hand. Furthermore, the user can simultaneously perform the different operations, thereby providing excellent operability.

In another configuration example, the second operation device may further include a second direction input device. The operation data may further include second direction data based on an output of the second direction input device. The processor may set a direction of the virtual camera on the basis of a position of the moving object and the second direction data, and may arrange the virtual camera at a position such that the player character object is included in a field of view of the virtual camera.

According to the above configuration example, the direction of the virtual camera can be changed by using the second direction input device. When the user wants to confirm, for example, the situation around the player character object, the virtual camera can be inclined in any direction, thereby enhancing convenience of the user.

In another configuration example, the processor may set the direction of the virtual camera, on the basis of the second direction data, within a predetermined range including a direction toward the moving object in the virtual space.

According to the above configuration example, while realizing a highly flexible operation that enables the user to freely move as an athlete in the virtual space and perform a swing action in any direction, the user is prevented from losing sight of the moving object. Thus, ease of playing the game can be enhanced.

In another configuration example, the first operation device may further include a second inertial sensor. The operation data may further include second inertial data based on an output of the second inertial sensor. The processor may further determine whether or not the first operation device and the second operation device have been swung at substantially the same timing, on the basis of the first inertial data and the second inertial data. Upon determining that the operation devices have been swung at substantially the same timing, the processor may cause the player character object to perform an action different from the swing action.

According to the above configuration example, the user can cause the player character object to perform an action other than the swing action, by using an operation of swinging the operation device. Thus, the range of options of actions that the player character object takes can be increased, thereby further enhancing entertainment characteristics of the game.

According to the exemplary embodiment, it is possible to provide a sport game system in which the user can directly and precisely designate a direction in which a player character object swings.

BRIEF DESCRIPTION OF THE DRAWINGS

FIG. 24 shows a non-limiting example of a data structure of player character relevant data 305;

FIG. 25 shows a non-limiting example of a data structure of motion data 307;

FIG. 26 is a non-limiting example of a data structure of kick motion correspondence data 308;

DETAILED DESCRIPTION OF NON-LIMITING EXAMPLE EMBODIMENTS

Hereinafter, the exemplary embodiment will be described. A game system according to an example of the exemplary embodiment is described below. An example of a game system 1 according to the exemplary embodiment includes a main body apparatus (an information processing apparatus, which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment is described, and then, the control of the game system 1 according to the exemplary embodiment is described.

Figure 1:
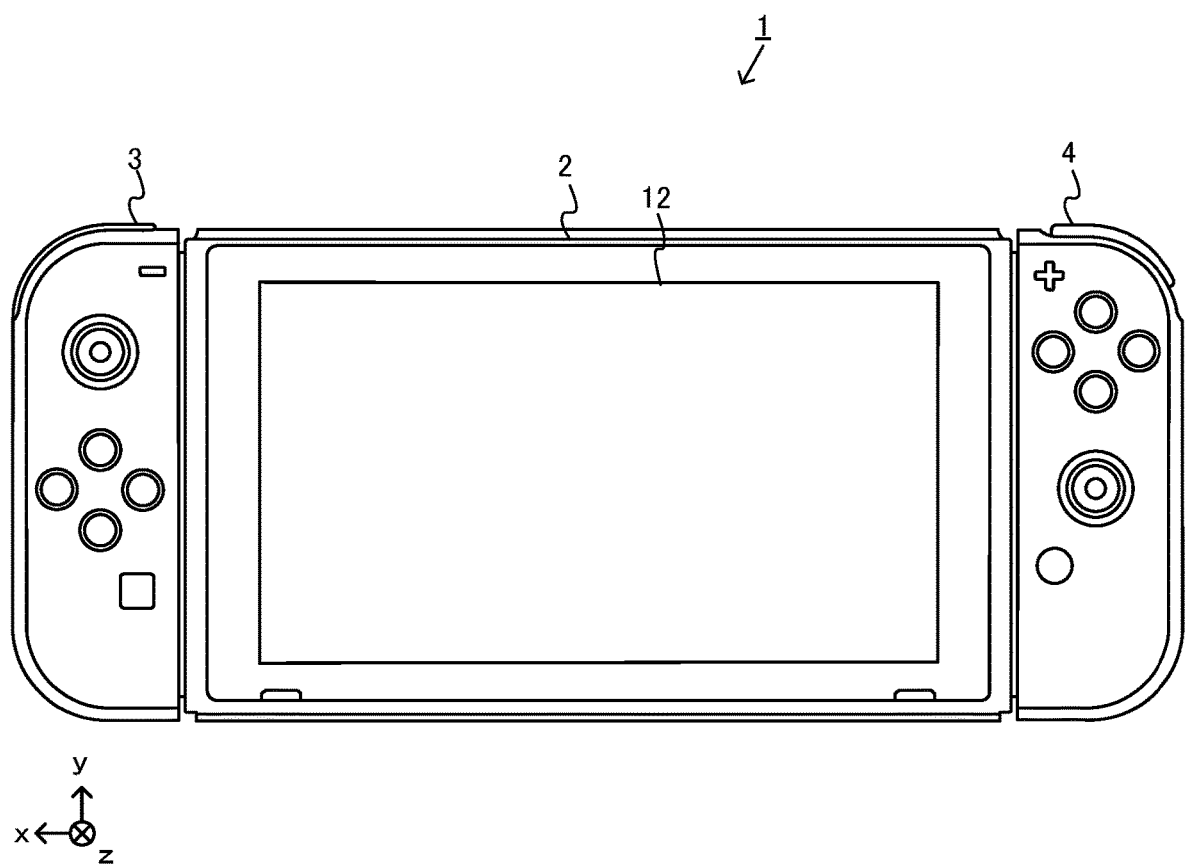
FIG. 1 shows a non-limiting example of the state where a left controller 3 and a right controller 4 are attached to a main body apparatus 2.

FIG. 1 shows an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
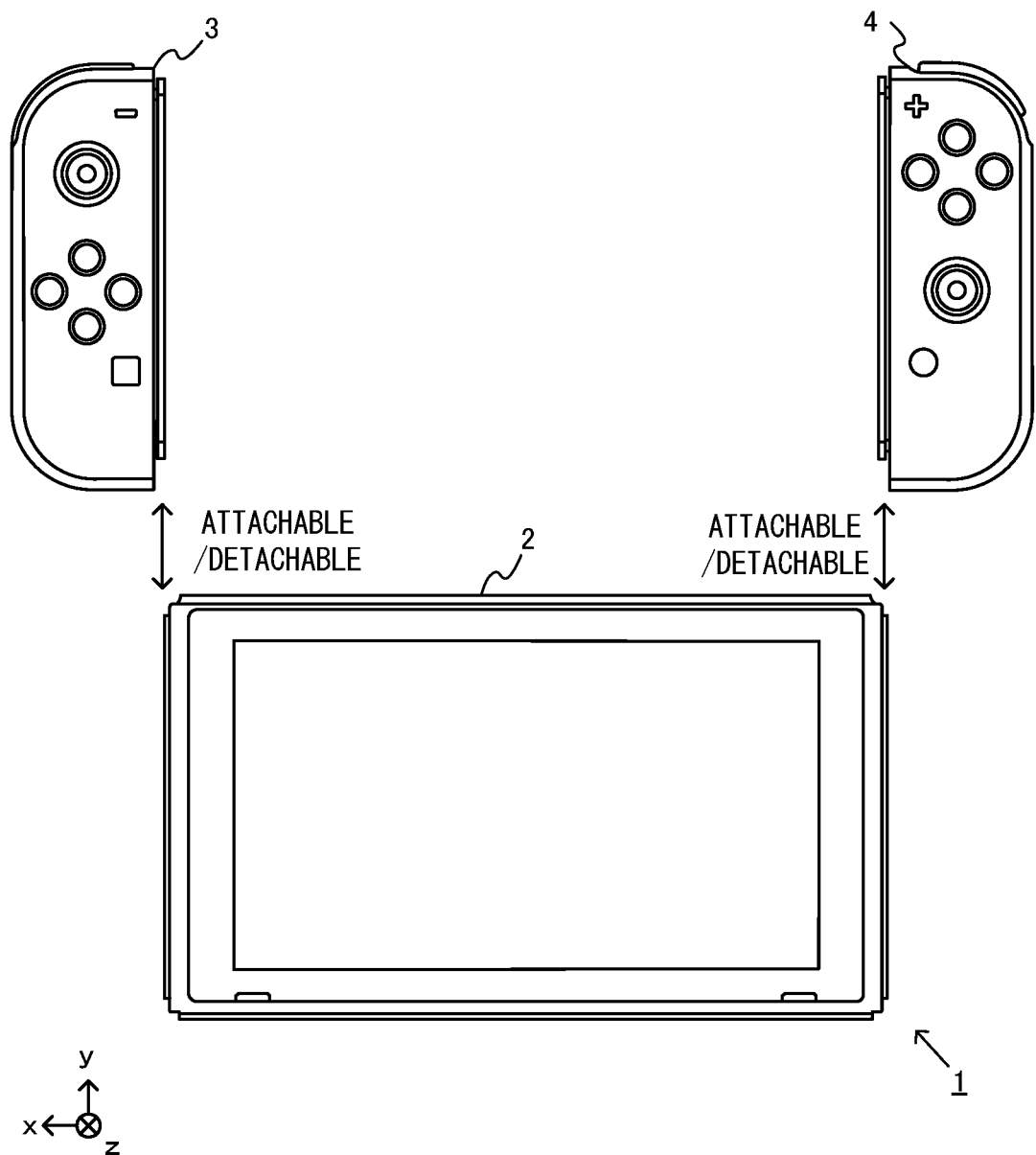
FIG. 2 shows a non-limiting example of the state where the left controller 3 and the right controller 4 are detached from the main body apparatus 2.

FIG. 2 shows an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
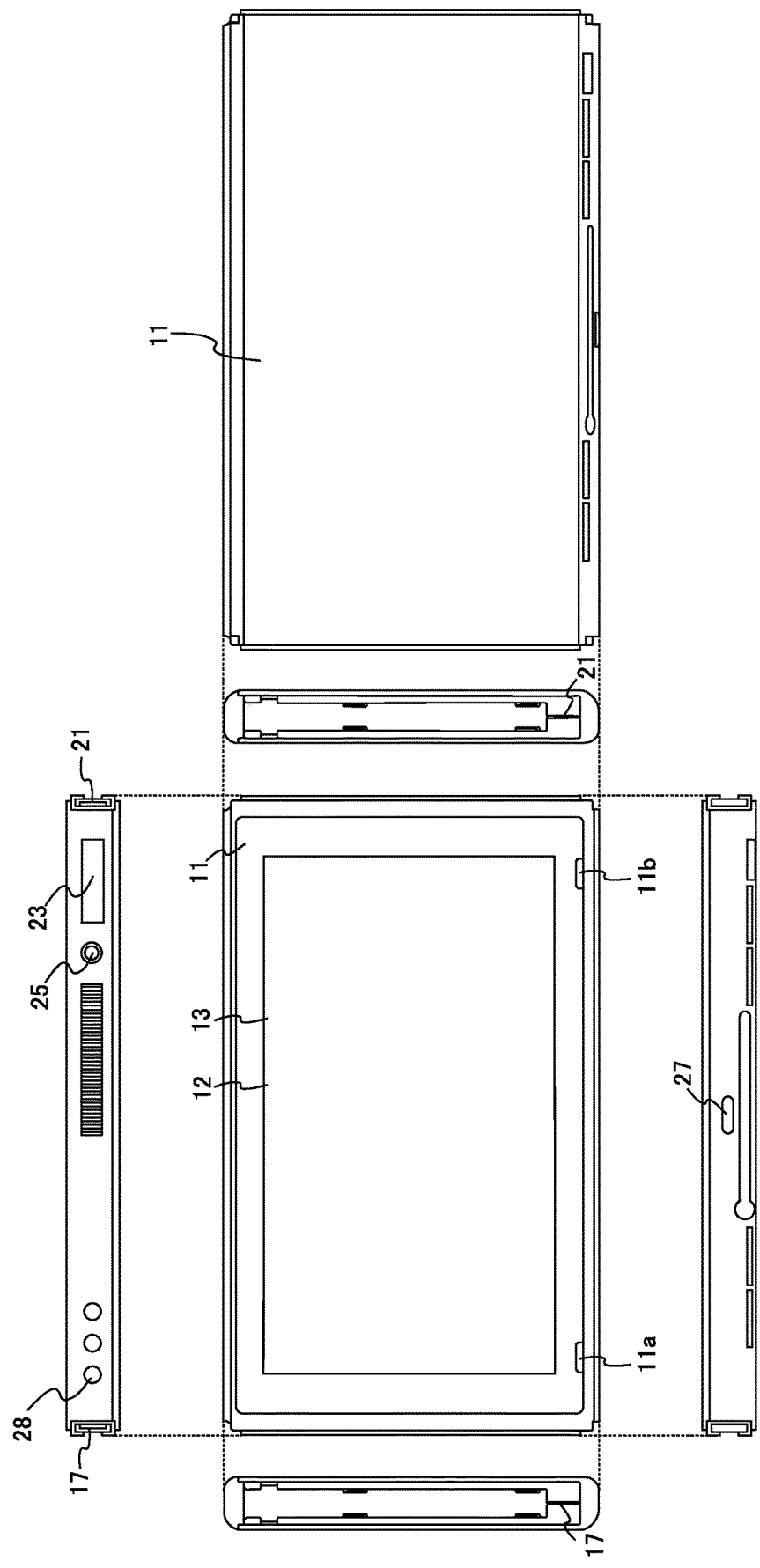
FIG. 3 is six orthogonal views showing a non-limiting example of the main body apparatus 2.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a substantially rectangular shape.

It should be noted that the shape and the size of the housing 11 are discretionary. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

The main body apparatus 2 includes a touch panel 13 on the screen of the display 12. In the exemplary embodiment, the touch panel 13 is of a type capable of receiving a multi-touch input (e.g., electrical capacitance type). However, the touch panel 13 may be of any type, and may be, for example, of a type capable of receiving a single-touch input (e.g., resistive film type).

The main body apparatus 2 includes speakers (i.e., speakers 88 shown in FIG. 6) within the housing 11. As shown in FIG. 3, speaker holes 11a and 11b are formed on the main surface of the housing 11. Then, sounds outputted from the speakers 88 are outputted through the speaker holes 11a and 11b.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and outputted from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

Figure 4:
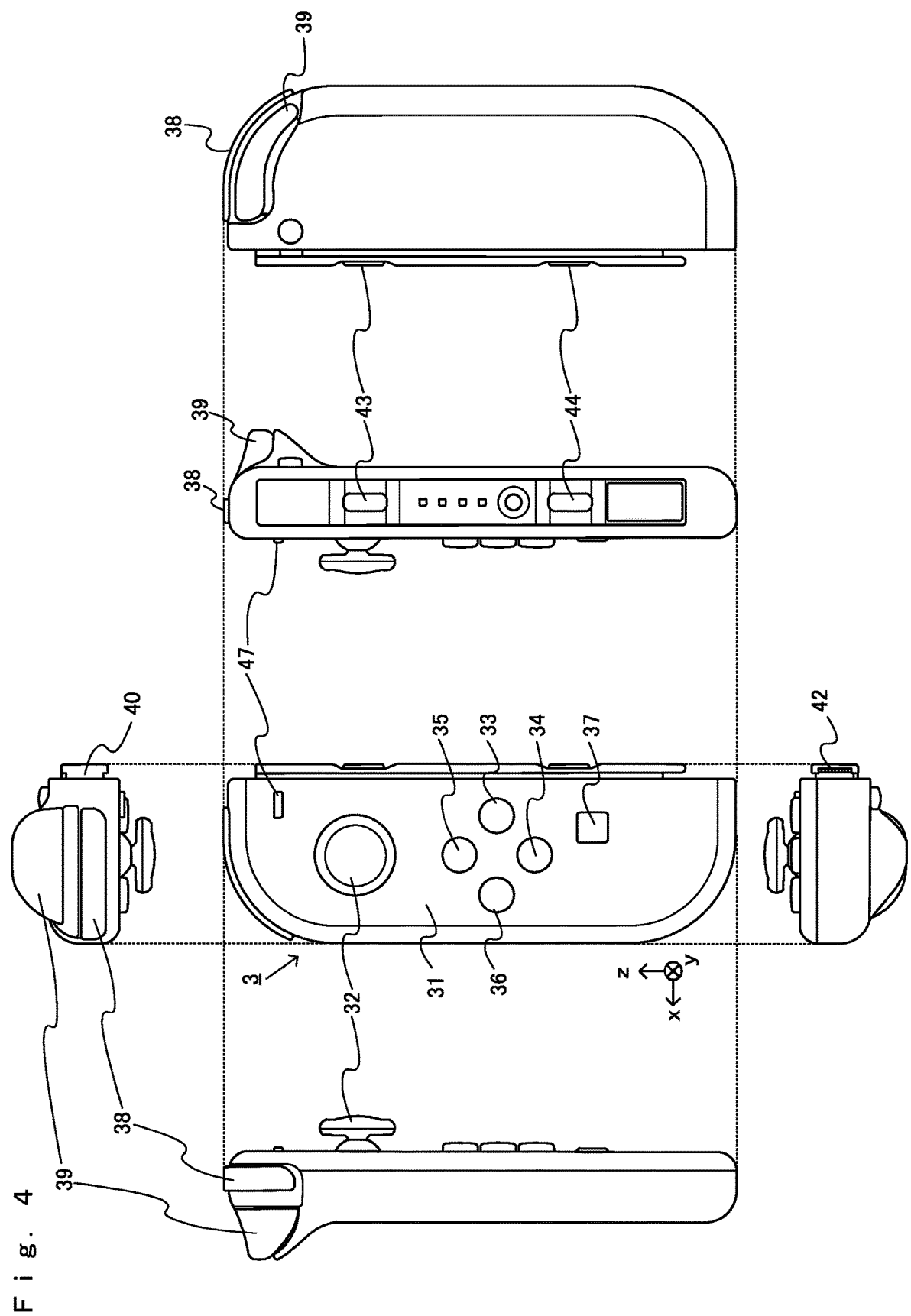
FIG. 4 is six orthogonal views showing a non-limiting example of the left controller 3.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction shown in FIG. 4 (i.e., a z-axis direction shown in FIG. 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly, the left hand. Further, the left controller 3 can also be held in the orientation in which the left controller 3 is horizontally long. When held in the orientation in which the left controller 3 is horizontally long, the left controller 3 may be held with both hands.

The left controller 3 includes a left analog stick (hereinafter, referred to as a "left stick") 32 as an example of a direction input device. As shown in FIG. 4, the left stick 32 is provided on a main surface of the housing 31. The left stick 32 can be used as a direction input section with which a direction can be inputted. The user tilts the left stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the left stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
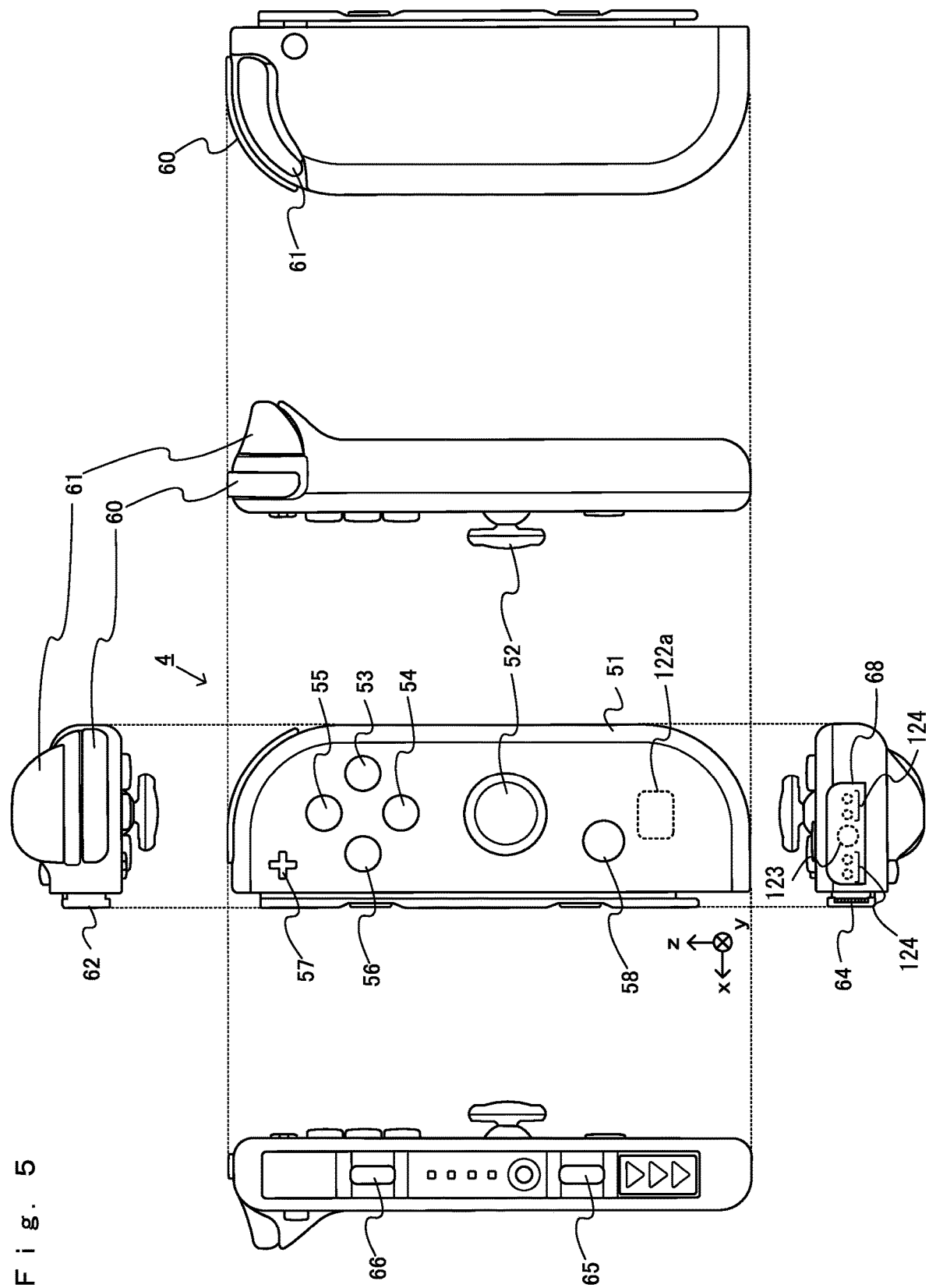
FIG. 5 is six orthogonal views showing a non-limiting example of the right controller 4.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction shown in FIG. 5 (i.e., the z-axis direction shown in FIG. 5). In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes a right analog stick (hereinafter, referred to as a "right stick") 52 as a direction input section. In the exemplary embodiment, the right stick 52 has the same configuration as that of the left stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
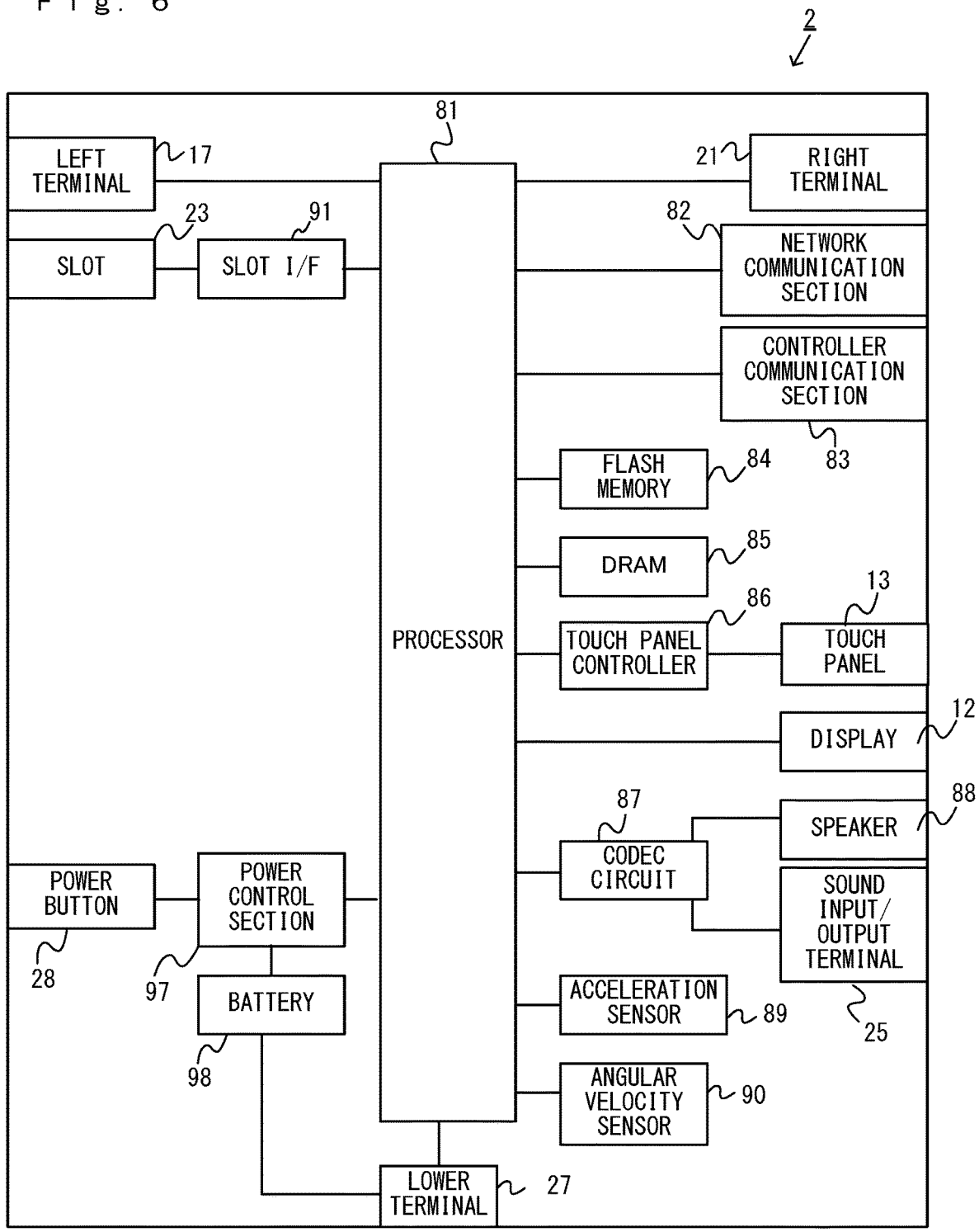
FIG. 6 is a block diagram showing a non-limiting example of the internal configuration of the main body apparatus 2.

FIG. 6 is a block diagram showing an example of the internal configuration of the main body apparatus 2. The main body apparatus 2 includes components 81 to 91, 97, and 98 shown in FIG. 6 in addition to the components shown in FIG. 3. Some of the components 81 to 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes the flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter, abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined method for communication (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is discretionary. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

The main body apparatus 2 includes a touch panel controller 86, which is a circuit for controlling the touch panel 13. The touch panel controller 86 is connected between the touch panel 13 and the processor 81. On the basis of a signal from the touch panel 13, the touch panel controller 86 generates data indicating the position at which a touch input has been performed, for example, and outputs the data to the processor 81.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). Based on a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 7:
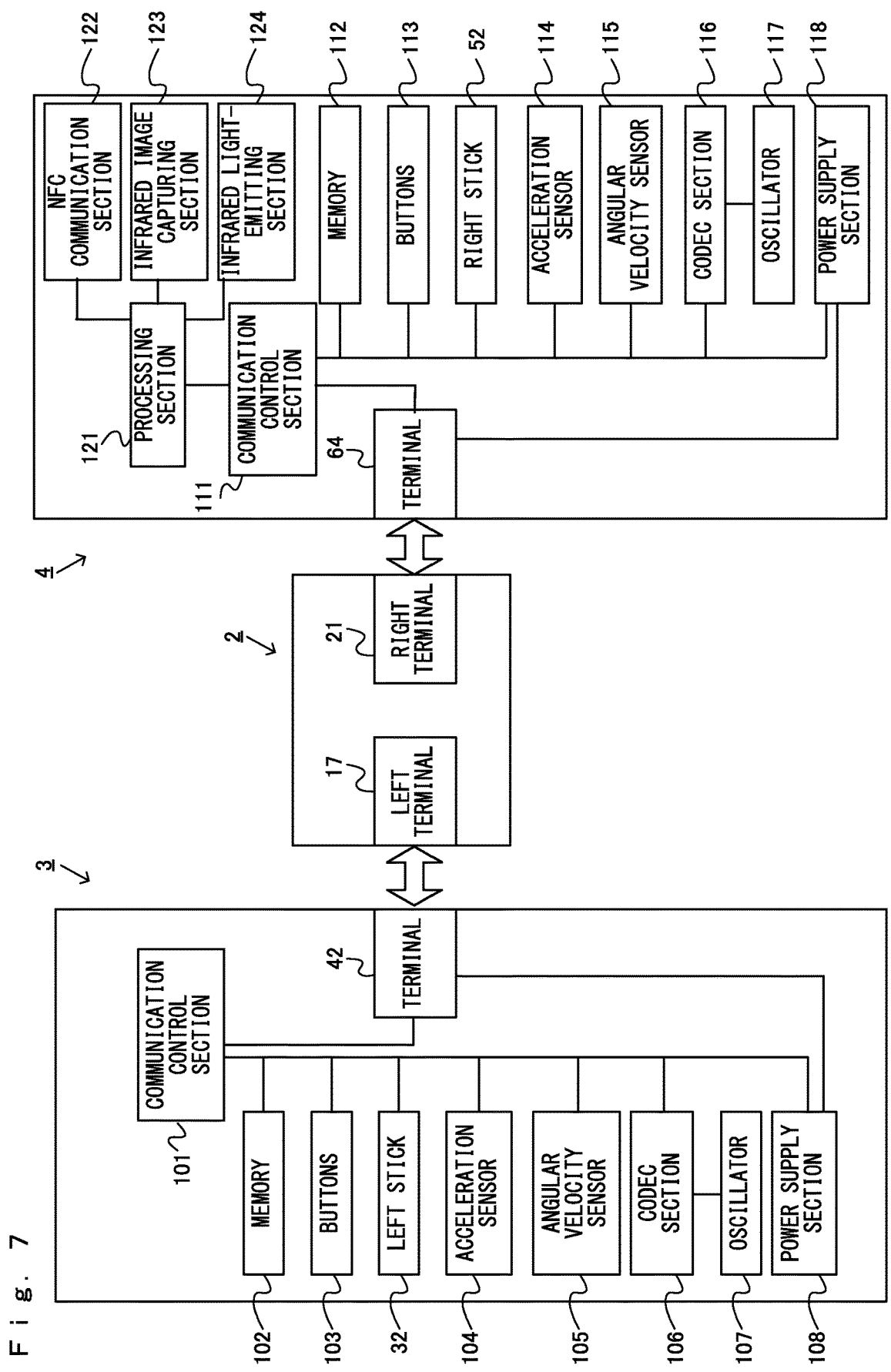
FIG. 7 is a block diagram showing non-limiting examples of the internal configurations of the main body apparatus 2, the left controller 3, and the right controller 4.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the left stick 32. Each of the buttons 103 and the left stick 32 outputs information regarding an operation performed on itself to the communication control section 101 repeatedly at appropriate timings.

The left controller 3 includes inertial sensors. Specifically, the left controller 3 includes an acceleration sensor 104. Further, the left controller 3 includes an angular velocity sensor 105. In the exemplary embodiment, the acceleration sensor 104 detects the magnitudes of accelerations along predetermined three axial (e.g., xyz axes shown in FIG. 4) directions. It should be noted that the acceleration sensor 104 may detect an acceleration along one axial direction or accelerations along two axial directions. In the exemplary embodiment, the angular velocity sensor 105 detects angular velocities about predetermined three axes (e.g., the xyz axes shown in FIG. 4). It should be noted that the angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are outputted to the communication control section 101 repeatedly at appropriate timings.

The communication control section 101 acquires information regarding an input (specifically, information regarding an operation or the detection result of the sensor) from each of input sections (specifically, the buttons 103, the left stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the left stick 32 based on the operation data. Further, the main body apparatus 2 can calculate information regarding the motion and/or the orientation of the left controller 3 based on the operation data (specifically, the detection results of the acceleration sensor 104 and the angular velocity sensor 105).

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, the right stick 52, and inertial sensors (an acceleration sensor 114 and an angular velocity sensor 115). These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

[Outline of Game Processing of Exemplary Embodiment]

Next, the outline of an operation of game processing executed by the game system 1 according to the exemplary embodiment will be described. As described above, in the game system 1, the left controller 3 and the right controller 4 are attachable to and detachable from the main body apparatus 2. When a game is played in the state where the left controller 3 and the right controller 4 are attached to the main body apparatus 2, a game image is outputted to the display 12. When the main body apparatus 2 alone in the state where the left controller 3 and the right controller 4 are detached from the main body apparatus 2 is attached to the cradle, the main body apparatus 2 can also output the game image to a stationary monitor or the like via the cradle. In the exemplary embodiment, description is given of an example case where the game is played in the latter mode. That is, the main body apparatus 2 alone in the state where the left controller 3 and the right controller 4 are detached from the main body apparatus 2 is attached to the cradle, and the main body apparatus 2 outputs the game image and the like to the stationary monitor or the like via the cradle. In addition, a case where the user plays the game while holding the left controller 3 with the left hand and the right controller with the right hand, is assumed.

[Assumed Game]

A game assumed in the exemplary embodiment is a sport game in which teams compete with each other in a virtual three-dimensional space. Specifically, the game is a team-versus-team sport game in which an impact is given to a moving object to move the moving object, each team raises the score by satisfying predetermined conditions, and a winning team and a losing team are determined based on their scores at the end of the game when a time limit has expired. In the exemplary embodiment, a soccer game is assumed as an example of the sport game. Therefore, a soccer ball object (hereinafter, simply referred to as "ball") is assumed as the above moving object. The above impact is, for example, a kick, heading, etc., performed to the ball by an athlete character object corresponding to an athlete in soccer. Of athlete character objects, a player character object that is an object to be operated by the user is simply referred to as "player character" in the following description. Meanwhile, the athlete character objects other than the player character are referred to as NPCs (Non-Player Characters).

As sport games other than the soccer game to which the exemplary embodiment is applicable, sport games simulating sports (mainly, ball games) in which a moving object is moved as in the aforementioned soccer, are conceivable. Examples of the sport games include tennis, volleyball, badminton, and hockey.

Figure 8:
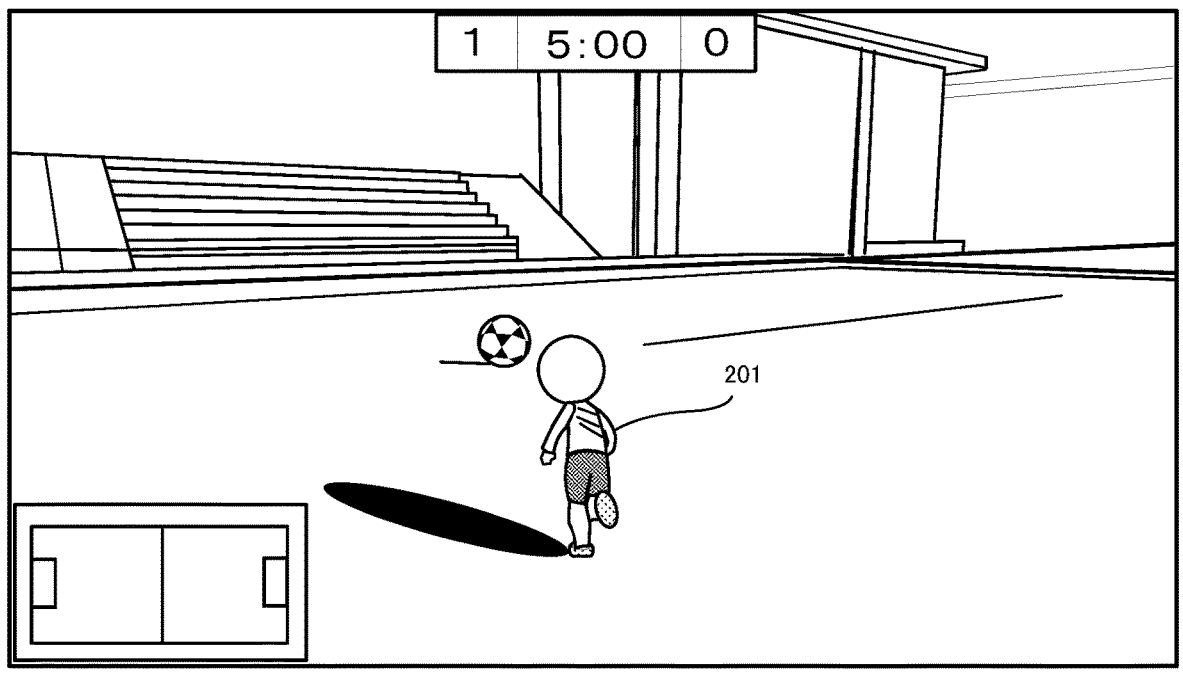
FIG. 8 shows a non-limiting example of a game screen according to an exemplary embodiment.

FIG. 8 shows an example of a screen of the soccer game assumed in the exemplary embodiment. This soccer game is basically progressed on a screen in a third-person view. That is, a virtual camera is located at a position a predetermined distance apart from a player character 201 (located behind the player character 201 in a default setting), and the game screen is displayed such that the whole body of the player character 201 is included in the field of view of the virtual camera. In addition, the virtual camera moves along with movement of the player character 201 while keeping the predetermined distance.

[Multi-Player Game]

The soccer game assumed in the exemplary embodiment is playable by multiple players through a network. More specifically, a plurality of game systems 1 (main body apparatuses 2) are communicably connected to each other, and each of participant users of the soccer game takes charge of one of the members (athlete players) of the teams to play the game. Therefore, in the soccer game assumed in the exemplary embodiment, each user who participates the game operates the own player character 201, as an athlete in the soccer team to which the user belongs. Specifically, each user can play the game as follows. That is, each user, at his/her own discretion, freely moves the player character 201 on a soccer field (hereinafter simply referred to as "field") constructed in the virtual game space, and earns a point by causing the player character 201 to shoot a ball into a goal object (hereinafter, simply referred to as "goal"). That is, this game allows the user to simulatively experience a feeling of acting as a member of a team in an actual soccer game. In the following description, athlete character objects operated by other users are also described as NPCs.

[Communication/Connection Form]

A supplemental description regarding a communication form between the game systems 1 will be given. In the exemplary embodiment, a communication form in which game systems 1 communicate with each other via the Internet is assumed. However, in another embodiment, main body apparatuses 2 may be connected so as to be directly and wirelessly communicable with each other. Moreover, in the exemplary embodiment, one user uses one game system 1 (one screen). In another embodiment, screen splitting may be used such that a plurality of users can simultaneously play the game by using one game system 1.

[Operation Method]

Figure 9:
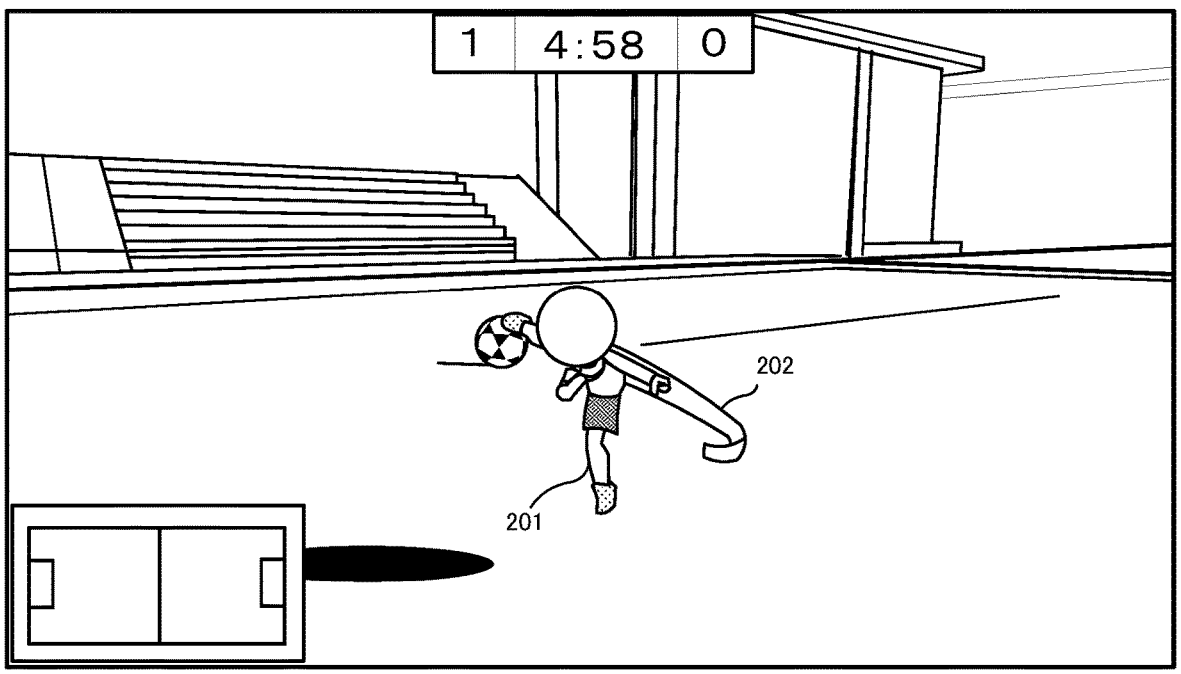
FIG. 9 shows a non-limiting example of the game screen according to the exemplary embodiment.

Next, an operation method in the soccer game will be described. In the soccer game, an operation method as follows is used. First, regarding movement of the player character 201, the user can freely move the player character 201 on the field by using a direction input to the left stick 32. Moreover, the user can cause the player character 201 to perform an action of swinging a leg, by performing an operation of swinging the right controller 4 (hereinafter referred to as "swing operation"). Hereinafter, the action of swinging a leg is referred to as a kick action. FIG. 9 shows an example of the game screen on which the player character 201 is performing the kick action. FIG. 9 shows an example of the kick action performed when the user swings the right controller 4 from the lower right side to the upper left side. On the game screen shown in FIG. 9, the player character 201 swings its right leg substantially obliquely upward. On this screen, a swing effect image 202 indicating the direction in which the leg is swung (kick direction) is also displayed. The swing effect image 202 is a band-like effect image indicating a (three-dimensional) trajectory of the swing.

Figure 10:
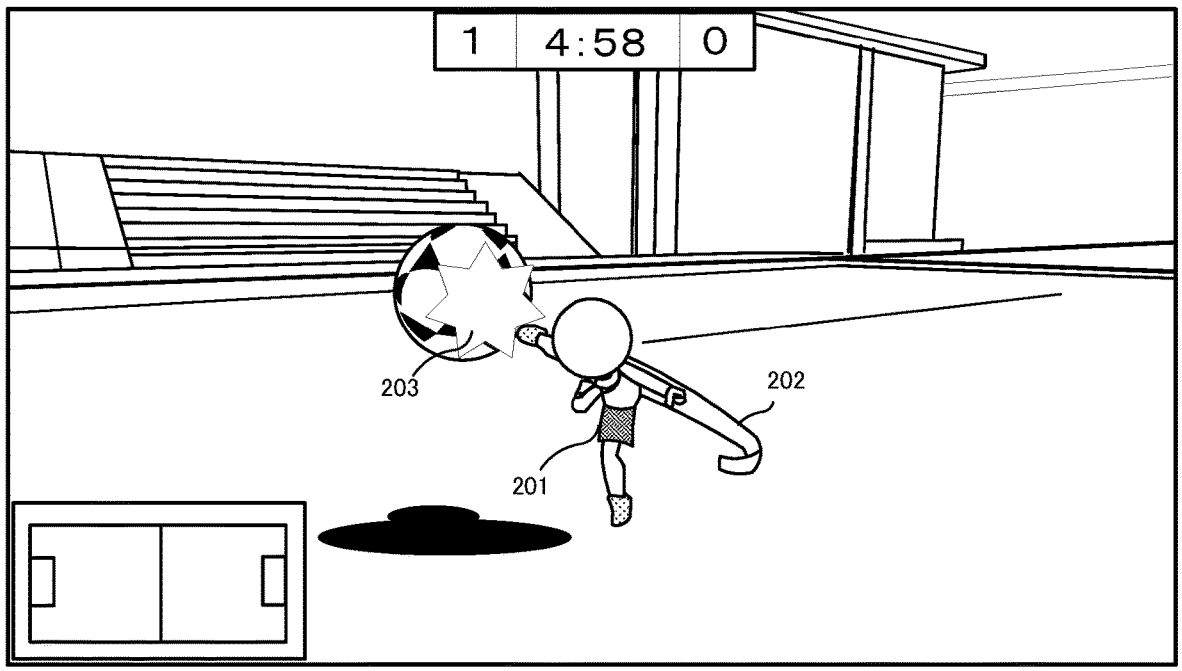
FIG. 10 shows a non-limiting example of the game screen according to the exemplary embodiment.
Figure 11:
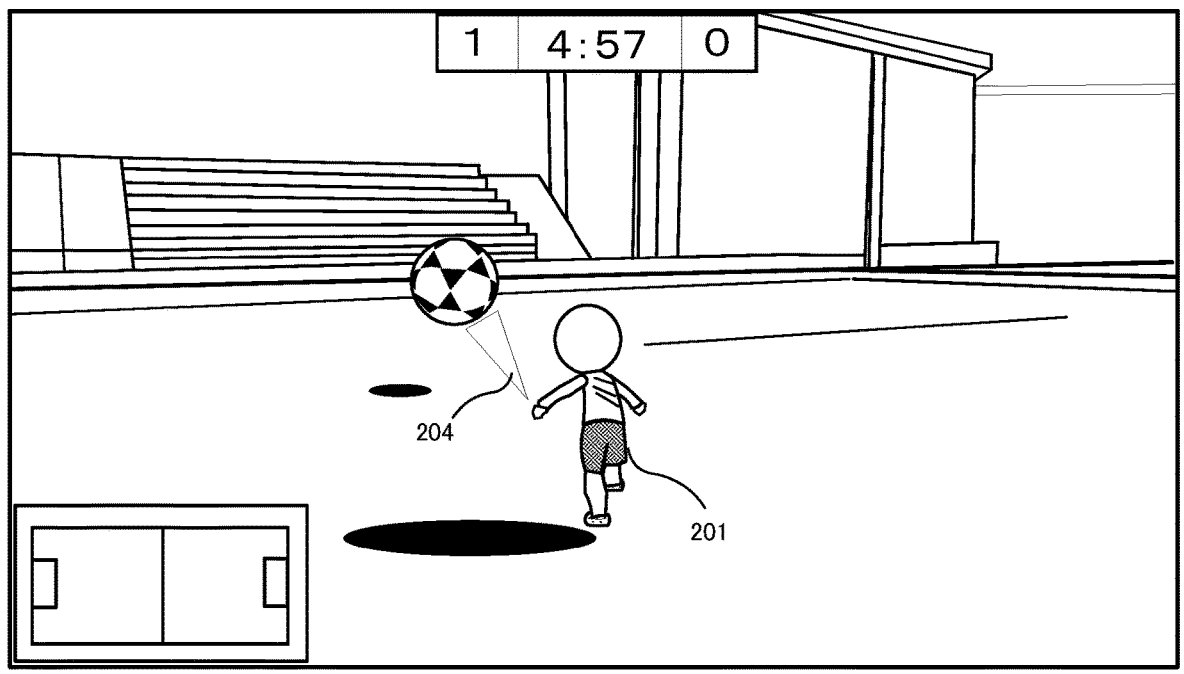
FIG. 11 shows a non-limiting example of the game screen according to the exemplary embodiment.

In the exemplary embodiment, the kick direction of the kick action is determined based on the swing direction of the swing operation and the imaging direction of the virtual camera. Specifically, using the front of the imaging direction of the virtual camera as a reference, a direction according to the swing direction is used as a kick direction. That is, the kick direction in the virtual game space is determined such that the swing direction viewed from the player corresponds to the kick direction viewed on the screen. Although the direction of the player character 201 is not used as a reference, when the player character 201 performs a kick action, the player character 201 is turned such that its forward direction coincides with the imaging direction, and thereafter starts the kick action. As a result of the kick action, when the leg of the player character 201 collides with the ball, the player character 201 kicks the ball and thereby moves the ball. FIG. 10 shows an example of the game screen on which the leg of the player character 201 collides with the ball through the kick action. In FIG. 10, the player character 201 is located at the same position as in FIG. 9, and the ball is located at a position just ahead of and near the player character 201. In FIG. 10, a collision effect 203 is also displayed. The collision effect 203 visually indicates that, as a result of the kick action, the leg of the player character 201 has collided with the ball, that is, has kicked the ball. FIG. 11 shows an example of the game screen indicating the state where the kicked ball is moved in a direction that is a little diagonally left-forward with respect to the player character 201. In FIG. 11, a ball movement effect 204 indicating a trajectory of movement of the kicked ball is also displayed. In FIG. 11, the player character 201, which has ended the kick action, is just before landing on the ground. Although described later in detail, the position and the direction of the virtual camera are automatically controlled according to movement of the ball such that the ball is displayed substantially near the center of the screen.

In the soccer game, a plurality of motions regarding the kick action (hereinafter referred to as "kick motions") are prepared. For example, different motion data are prepared for a kick motion of kicking the ball with the right leg and a kick motion of kicking the ball with the left leg. These motion data are stored in association with the kick directions. A motion according to the kick direction is selected as appropriate and displayed (reproduced).

The contents of movement (ejection angle and movement path) of the ball kicked by the kick action are determined based on the kick direction and the way of contact. In addition, a flying distance and a moving velocity of the ball are determined based on the strength of the swing in the swing operation regarding the kick action. For example, the greater the strength of the swing is, the stronger the kick is, and the farther the ball flies.

As described above, the basis operation in the soccer game includes: causing the player character 201 to move by using the left stick 32; and causing the player character 201 to perform a kick action by the swing operation of the right controller 4. A method for calculating a swing direction and a method for determining a ball movement content will be described later in detail.

Next, a supplemental description regarding an operation other than the aforementioned operations during the soccer game will be given. First, regarding the aforementioned kick action, if the user twists his/her wrist (rotation of the right controller 4 around the z axis) during the swing operation, the trajectory of movement of the ball can be curved according to an angle of the twist. In addition to the kick action, the user can cause the player character 201 to perform a heading action. In the exemplary embodiment, the user can cause the player character 201 to perform a heading action by simultaneously swinging the right controller 4 and the left controller 3. This simultaneous swing may not necessarily be exactly "simultaneous" in terms of time, and may be regarded as "simultaneous" when the right controller 4 and the left controller 3 are swung at substantially the same timing even if there is some time lag.

The user can cause the player character 201 to jump by pressing the B-button 54. Regarding movement of the player character 201, the user can cause the player character 201 to dash by operating the left stick 32 while pressing the ZL-button 39.

Regarding the heading action and the dash, consumption of stamina may be considered. That is, a parameter of "stamina" is prepared as one of parameters regarding the player character 201 (in this case, a stamina gauge or the like may be displayed on the screen). A predetermined amount of stamina consumption may be required for a heading action or dash.

[Control of Virtual Camera]

Next, a control of the virtual camera in the soccer game will be described. As described above, in the soccer game, the game screen is expressed in a third-person view. Therefore, basically, the position and the direction of the virtual camera are controlled such that the player character 201 is always included in the field of view of the virtual camera. Moreover, in the soccer game, in order to prevent the user from losing sight of the ball, the virtual camera is controlled such that the imaging direction of the virtual camera (direction of the virtual camera) follows the position of the ball to some extent.

Figure 12:
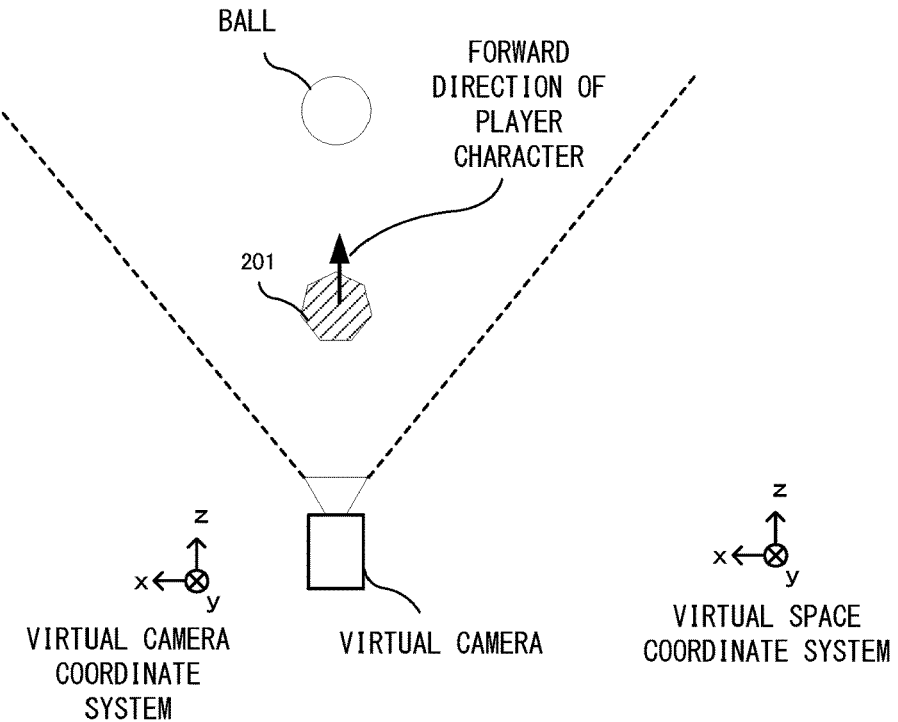
FIG. 12 illustrates a non-limiting example of control of a virtual camera.

First, a default state of the virtual camera will be described. FIG. 12 shows a positional relationship as a default state between the virtual camera and the player character 201. In the default state, the virtual camera is located at a position that is on the back side of the player character 201 and is a predetermined distance apart from the player character 201. In the default state, the virtual camera is in an orientation such that the imaging direction thereof is orthogonal to a y axis of a virtual space coordinate system. A height (position on the y axis) of the virtual camera in the default state is set to a height such that, when the player character 201 is not floating in the air (when it is in contact with the field), the head of the player character 201 is displayed near the center of the game screen.

When the player character 201 moves in a z-axis positive direction of the virtual space coordinate system from the state shown in FIG. 12, the virtual camera also moves and follows the player character 201 from behind while keeping the predetermined distance.

Figure 13:
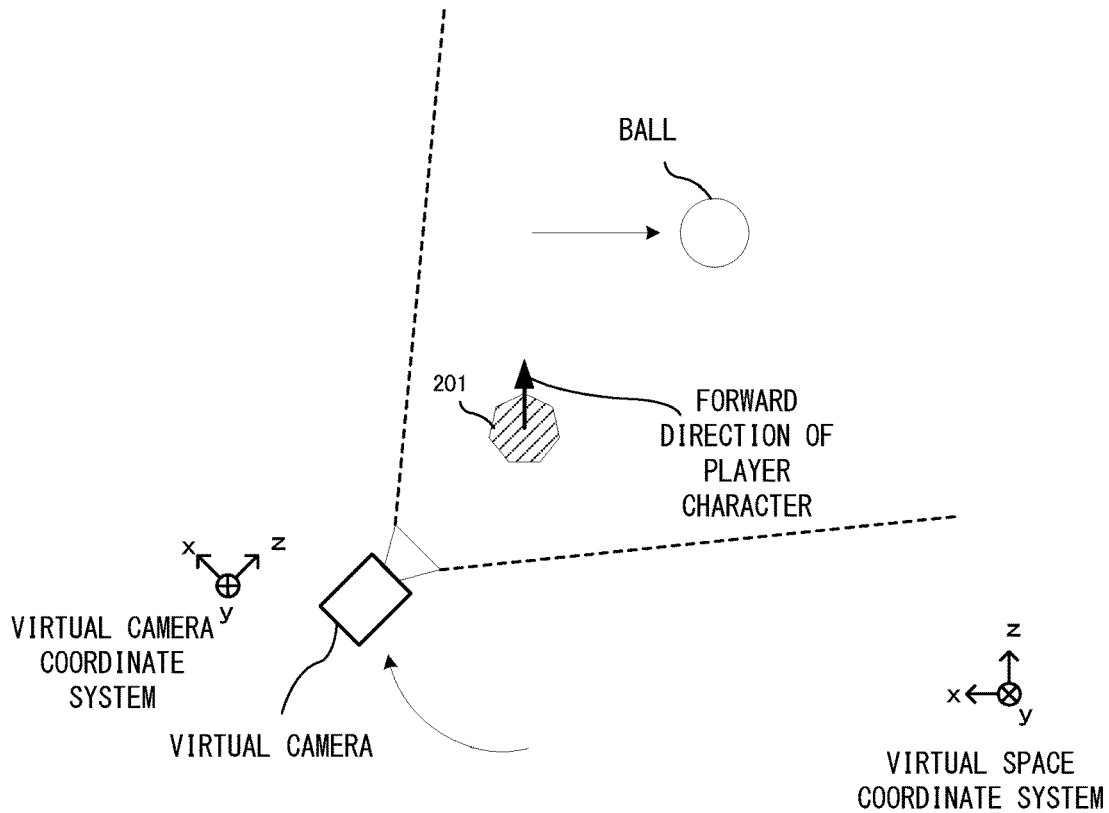
FIG. 13 illustrates a non-limiting example of control of the virtual camera.

Next, a virtual camera direction follow-up control will be described. For example, it is assumed that, from the state shown in FIG. 12, only the ball has moved rightward (in an x-axis negative direction of the virtual space coordinate system) while the player character 201 has not moved. In this case, the virtual camera is controlled as follows. That is, the position and the direction of the virtual camera are changed such that the imaging direction follows the position of the ball as shown in FIG. 13. Specifically, the position of the virtual camera is changed so as to have a movement trajectory that rotates around the player character 201 while keeping the predetermined distance (i.e., the player character 201 is always inside the field of view of the virtual camera). The direction of the virtual camera is controlled such that the ball is displayed at substantially the center of the game screen. This allows the ball to be always displayed in the game screen, and prevents the user from losing sight of the ball.

When both the player character 201 and the ball are moving, the direction of the virtual camera is controlled such that the ball is substantially in front of the imaging direction as shown in FIG. 13 while the position of the virtual camera is changed according to the position of the player character 201.

Figure 14:
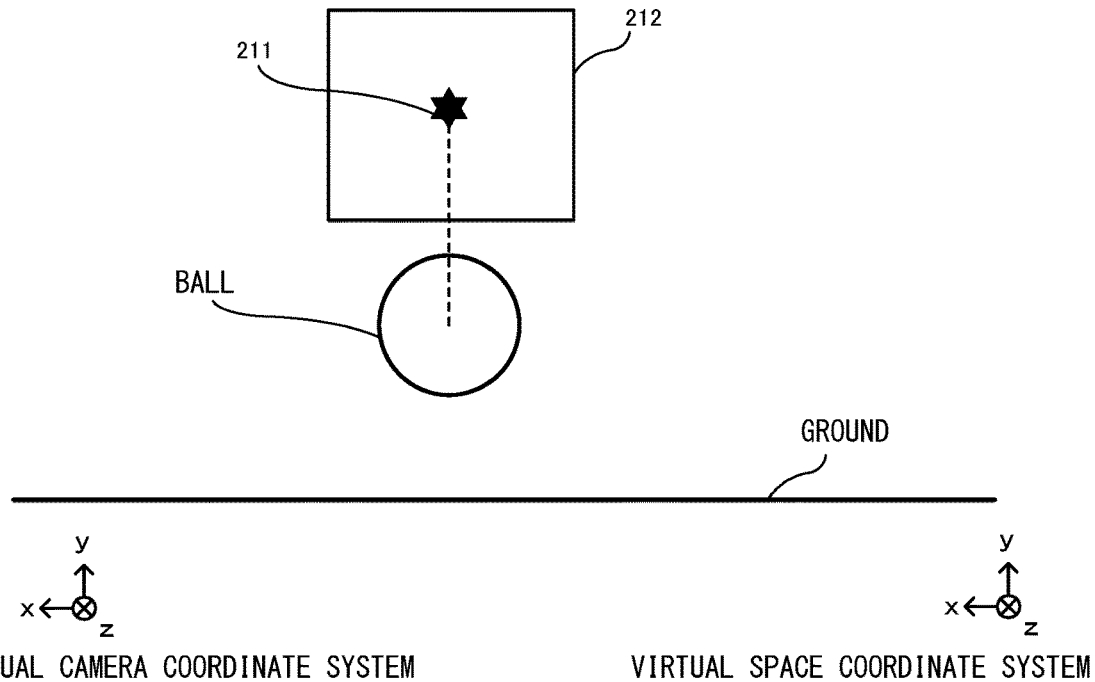
FIG. 14 illustrates a non-limiting example of control of the virtual camera.
Figure 15:
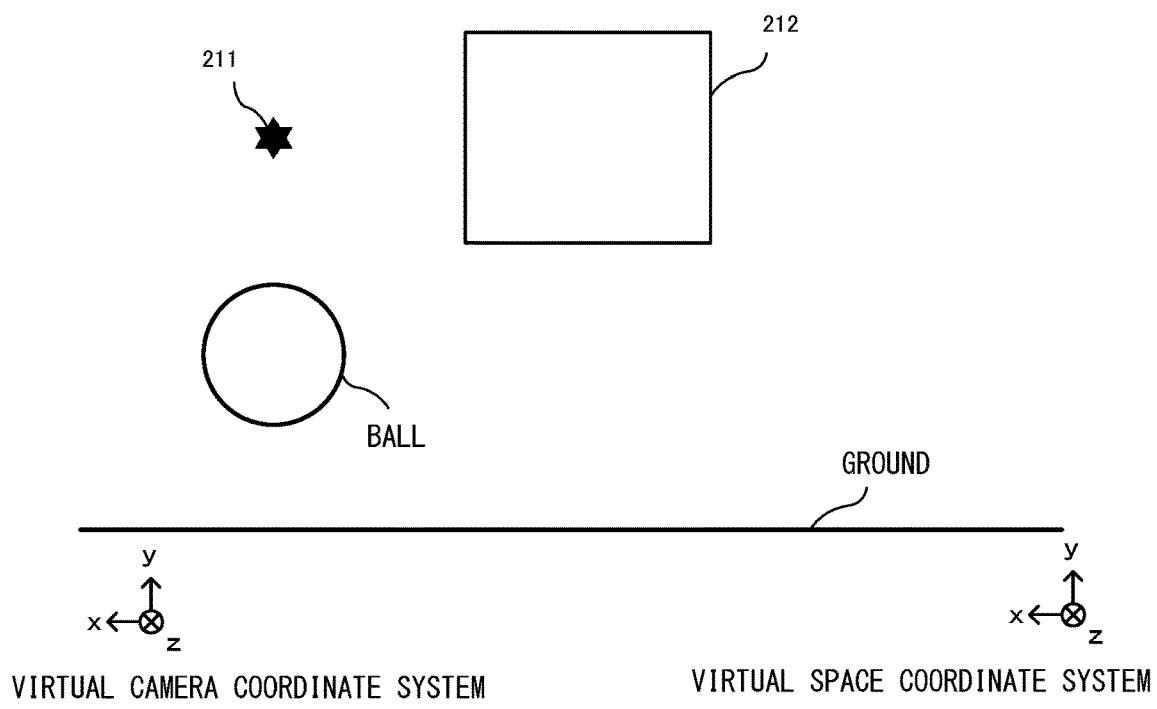
FIG. 15 illustrates a non-limiting example of control of the virtual camera.

Here, a principle of a control for causing the direction of the virtual camera to follow the ball in the soccer game, will be described. FIG. 14 illustrates the principle. First, in the virtual space coordinate system, a target point 211 is set at a position a predetermined distance apart in a vertically upward direction from the position of the ball. The target point is calculated as three-dimensional coordinates. Furthermore, a follow-up determination area 212 which is a two-dimensional rectangular area is set on an xy plane (projection plane) of a virtual camera coordinate system. In the processing of the soccer game, the direction of the virtual camera is changed as needed such that the target point 211 falls within the follow-up determination area 212 on the xy plane in the virtual camera coordinate system. For example, as shown in FIG. 15, when the target point is on the left side of the follow-up determination area 212, the direction of the virtual camera is changed such that the follow-up determination area 212 moves leftward. The direction of the virtual camera is not instantaneously changed, but is changed over a predetermined time such that the follow-up determination area 212 gradually approaches the target point. At this time, the greater the distance between the target point 211 and the follow-up determination area 212 is, the greater the angle of change, per unit time, in the direction of the virtual camera becomes (i.e., the greater the distance from the ball is, the higher the follow-up speed of the direction of the virtual camera becomes).

In a case where the target point 211 is included in the follow-up determination area 212, the operation of causing the direction of the virtual camera to follow the ball is stopped in the exemplary embodiment. Therefore, the follow-up operation of the direction of the virtual camera can be stopped when the target point 211 is not located in the center of the follow-up determination area 212, for example, when the target point 211 is located near an outer frame of the follow-up determination area 212. In the soccer game, the ball is constantly moving in many cases. Then, if the virtual camera is caused to exactly follow the ball such that the ball is displayed in the center of the screen, there is a possibility that the game screen becomes difficult to be seen. Therefore, in the exemplary embodiment, the follow-up operation is stopped when the ball roughly comes near the center of the game screen. In this regard, in another embodiment, for example, a control of changing the direction of the virtual camera may be performed with an easier pace than in the case where the target point 211 is outside the follow-up determination area 212, until the target point 211 is located at a center point of the follow-up determination area 212.

Figure 16:
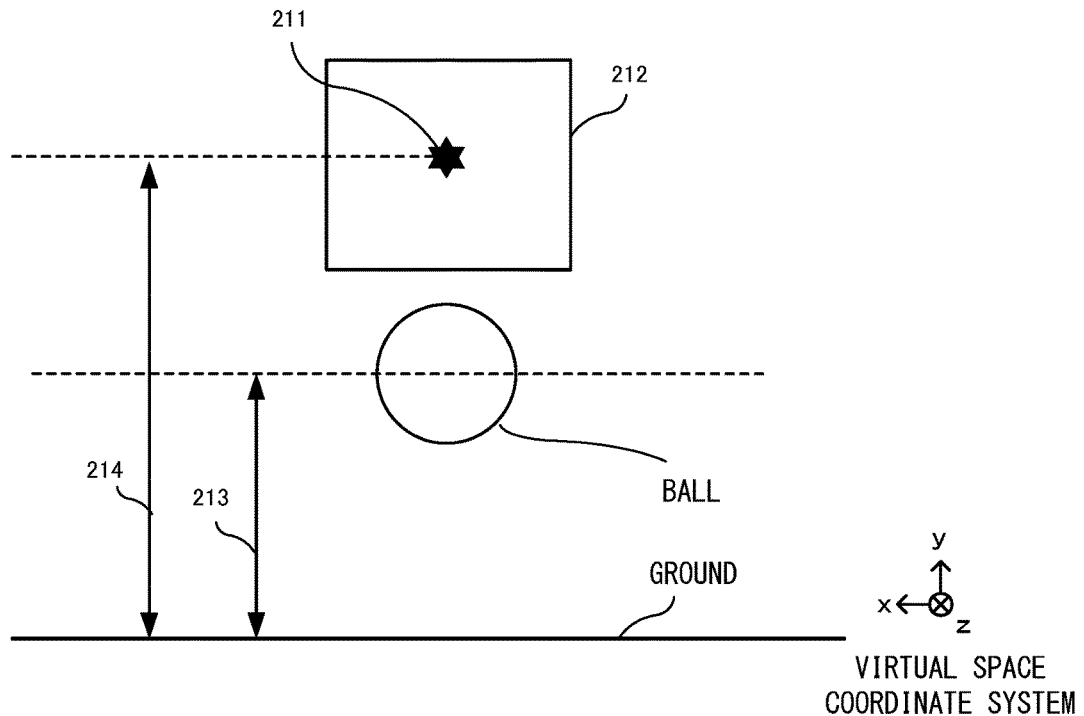
FIG. 16 illustrates a non-limiting example of control of the virtual camera.
Figure 17:
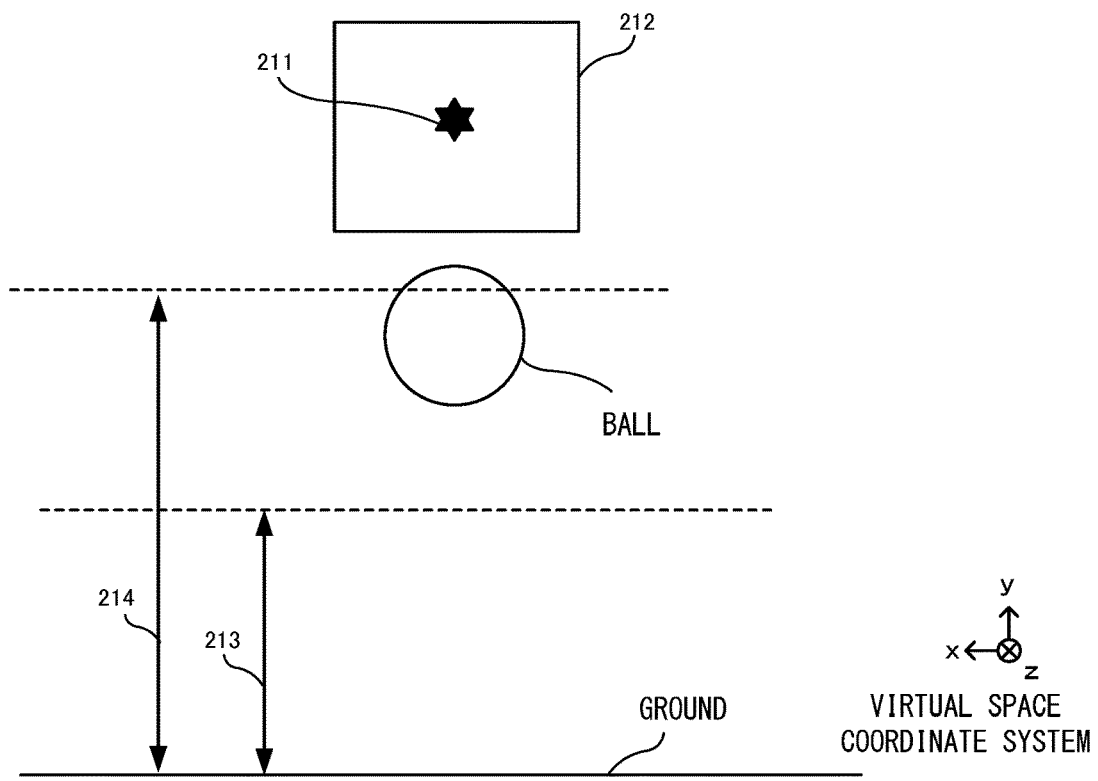
FIG. 17 illustrates a non-limiting example of control of the virtual camera.

The above-described virtual camera direction follow-up control is also applicable to a height direction (a y-axis direction of the virtual camera coordinate system), and a control as follows is exceptionally performed. FIG. 16 illustrates a principle of this control. In the exemplary embodiment, when a y-axis position (height from the ground) of a center point of the ball in the virtual space coordinate system is equal to or lower than a first height 213, a control is also performed such that the y-axis position of the target point 211 is not lower than a second height 214. For example, when the center point of the ball is present at a position equal to or higher than the first height 213 from the ground, the y-axis position of the target point 211 is set at a position equal to or higher than the second height 214 as shown in FIG. 17.

Figure 18:
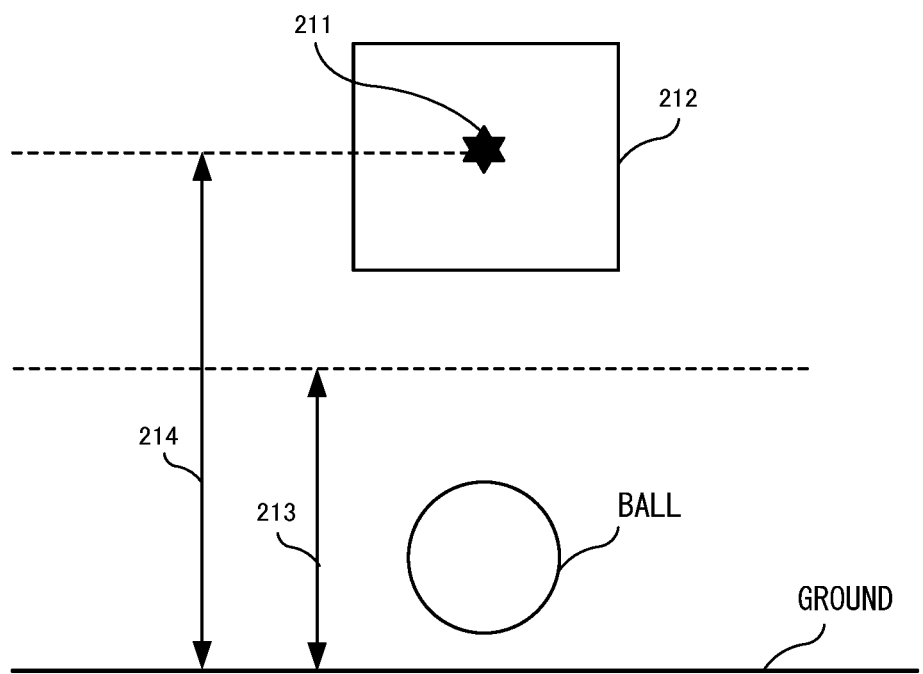
FIG. 18 illustrates a non-limiting example of control of the virtual camera.

Meanwhile, as shown in FIG. 18, when the height of the center point of the ball from the ground is equal to or lower than the first height 213, the target point 211 is set such that the y-axis position thereof is not lower than the second height 214. In this case, a linear distance between the center point of the ball and the target point 211 may be longer than that in the case of FIG. 17. That is, when the ball is close to the ground to a certain extent, the virtual camera direction follow-up control in the y-axis direction is not performed. Thus, for example, in a scene in which the ball continuously bounces at a low position, the game screen is prevented from being displayed as if it shakes up and down according to the bouncing ball, thereby providing an easy-to-view game screen.

Figure 19:
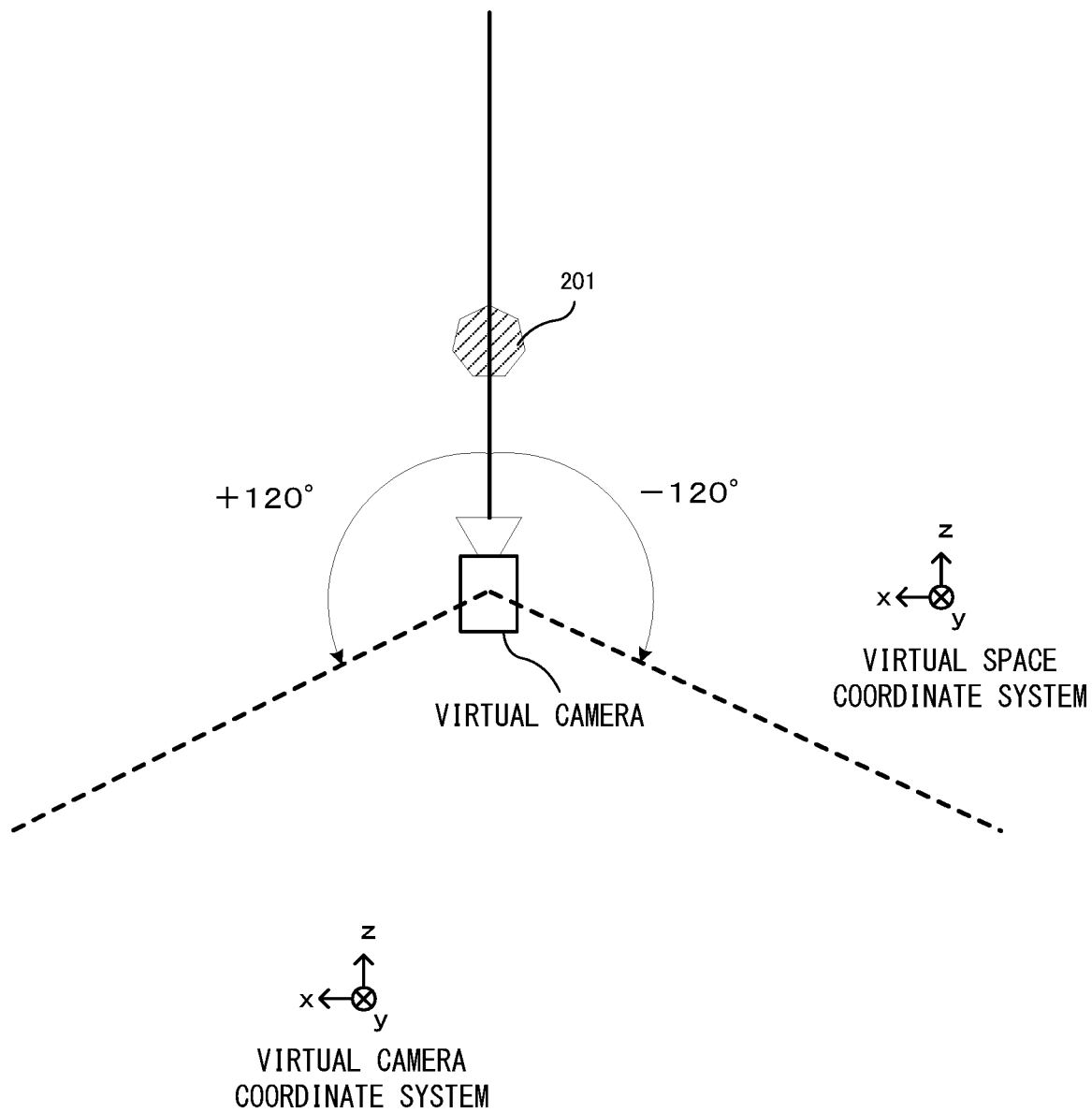
FIG. 19 illustrates a non-limiting example of control of the virtual camera.

Next, a camera control using the right stick 52 will be described. In this soccer game, basically, the follow-up control for causing the ball to be always included in the game screen as described above is automatically performed. Aside from this, the user can temporarily change the direction of the virtual camera by operating the right stick 52. That is, while a direction input is caused by the right stick 52, the direction of the virtual camera can be changed in a direction according to the input direction. For example, when the right stick 52 is tilted to the right, the direction of the virtual camera can be rotated rightward while the right stick 52 is tilted. However, in the processing of this soccer game, from the viewpoint of preventing the user from losing sight of the ball, the range of this rotation (movable range) is limited. Specifically, as shown in FIG. 19, assuming that the forward direction of the virtual camera when the input to the right stick 52 is neutral is 0°, a range of 120° on each of the left side and the right side is set as a movable range of the virtual camera due to the right stick 52. The reason is as follows. That is, in this soccer game (in relation to the angle of view or the like of the virtual camera), the above range prevents the player character 201 and the ball from going outside of the game screen. The value of 120° is an example, and any value may be used as appropriate according to the angle of view or the like of the virtual camera as long as the player character 201 and the ball are prevented from going outside of the game screen.

Figure 20:
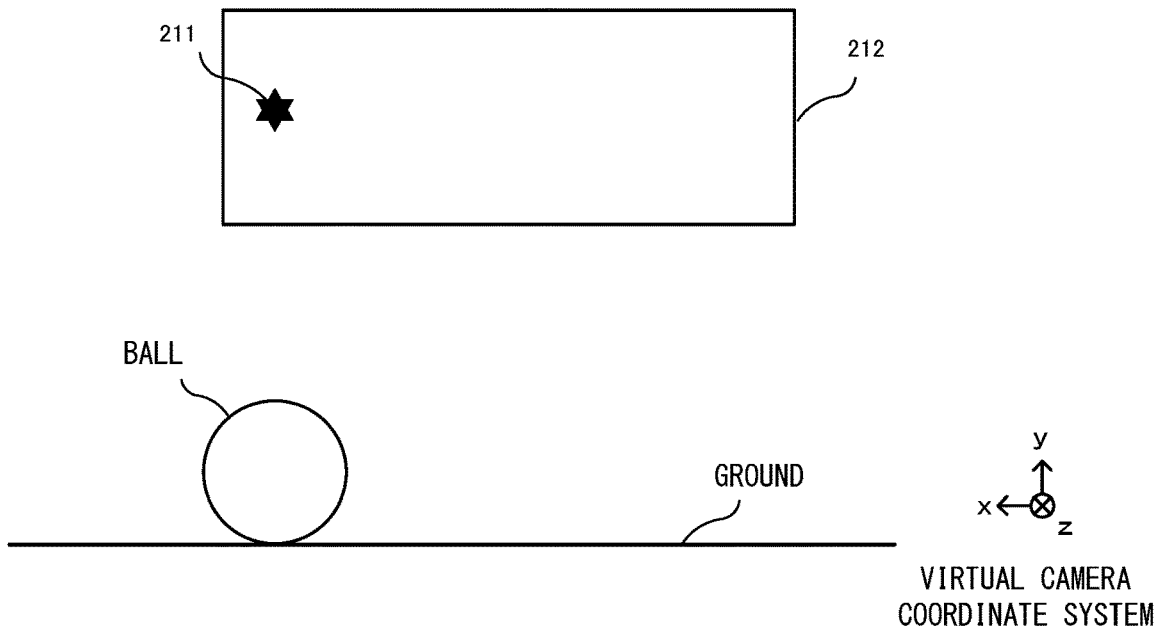
FIG. 20 illustrates a non-limiting example of control of the virtual camera.
Figure 21:
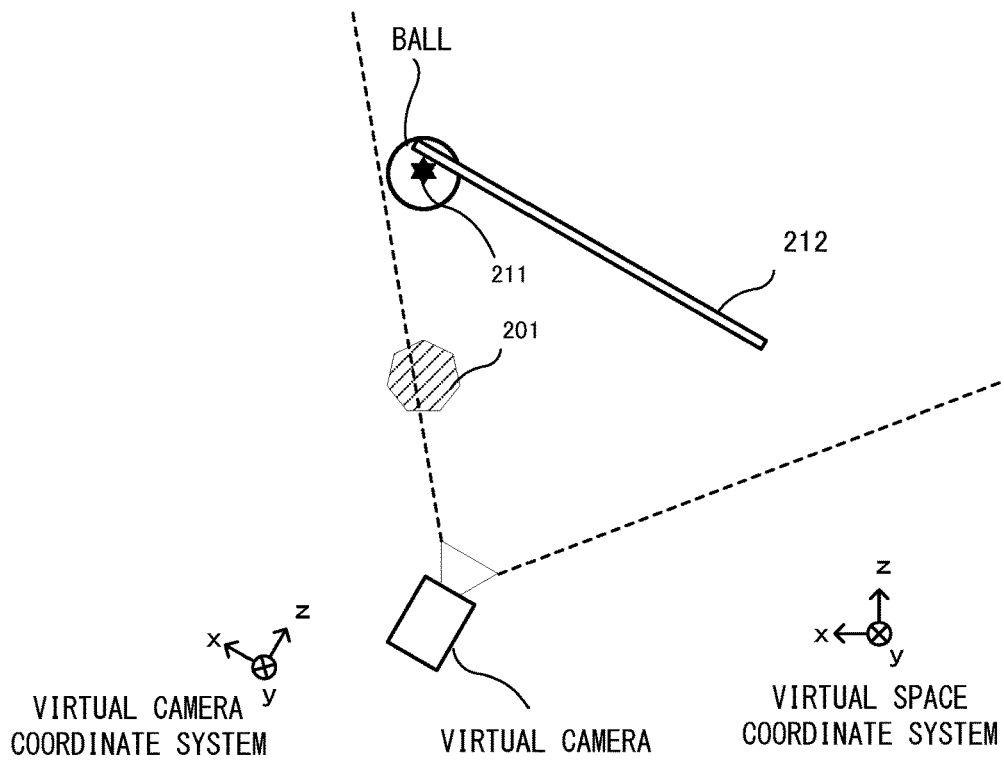
FIG. 21 illustrates a non-limiting example of control of the virtual camera.

Furthermore, when a direction input is caused by the right stick 52, a control as follows is also performed regarding the automatic virtual camera direction follow-up control as described above. That is, first, when such an input has occurred, there is a high possibility that the user wants to confirm the situation in the direction to which the virtual camera is directed. Therefore, in this case, a control of maintaining the direction of the virtual camera is performed while the automatic virtual camera direction follow-up control as described above is temporarily inhibited. Specifically, when a direction input is caused by the right stick 52, the size of the follow-up determination area 212 is temporarily changed according to the input direction to prevent the automatic follow-up. FIG. 20 and FIG. 21 show an example of the follow-up determination area 212 in a case where the ball stops and the right stick 52 is tilted to the right. FIG. 20 shows a positional relationship between the ball, the target point 211, and the follow-up determination area 212 as viewed from the virtual camera (the player character 201 is omitted). FIG. 21 is an overhead view of the positional relationship shown in FIG. 20. In the example shown in FIG. 20, the follow-up determination area 212 has a shape obtained by extending, to the right, the breadth of the follow-up determination area 212 shown in FIG. 14, according to the rightward direction input to the right stick 52 (magnitude of tilting of the right stick 52). Since the follow-up determination area 212 is increased according to the input direction of the right stick 52, even when the imaging direction of the virtual camera is rotated rightward, the target point 211 is maintained to be inside the follow-up determination area 212. This inhibits the automatic virtual camera direction follow-up operation as described above, and maintains the virtual camera facing to the right according to the input of the user.

When the direction input to the right stick 52 is canceled (is returned to be neutral), the follow-up determination area 212 is not extended. Moreover, when the direction input to the right stick 52 is neutral and the target point 211 falls within the follow-up determination area 212, the follow-up determination area 212 is reduced. Thus, the automatic follow-up control is naturally resumed.

In another embodiment, when the target point 211 is inside the follow-up determination area 212, a control of changing the direction of the virtual camera at an easy pace until the target point 211 comes to the center of the follow-up determination area 212, may be performed.

In the exemplary embodiment, the automatic follow-up is temporarily inhibited by increasing the follow-up determination area 212 with an input to the right stick 52. In this regard, in another embodiment, while an input to the right stick 52 is maintained, a control of degrading follow-up performance may be performed instead of completely inhibiting the follow-up operation.

[Control of Other Behaviors]

In the processing of the soccer game, a control as follows is performed regarding a behavior of the player character 201, in addition to the aforementioned processing. That is, when the positional relationship between the player character 201 and the ball satisfies a predetermined condition, a control of directing the line of sight of the player character 201 toward the ball is also performed. For example, the predetermined condition is that the distance between the player character 201 and the ball is equal to or smaller than a predetermined distance and that a difference in angle between the forward direction of the player character 201 and the direction from the player character 201 to the position of the ball is equal to or smaller than a predetermined angle. This allows the user to easily visually recognize the direction in which the ball is present.

[Details of Soccer Game Processing of Exemplary Embodiment]

Next, soccer game processing according to the exemplary embodiment will be described in more detail with reference to FIGS. 22 to 33.

[Data to be Used]

Figure 22:
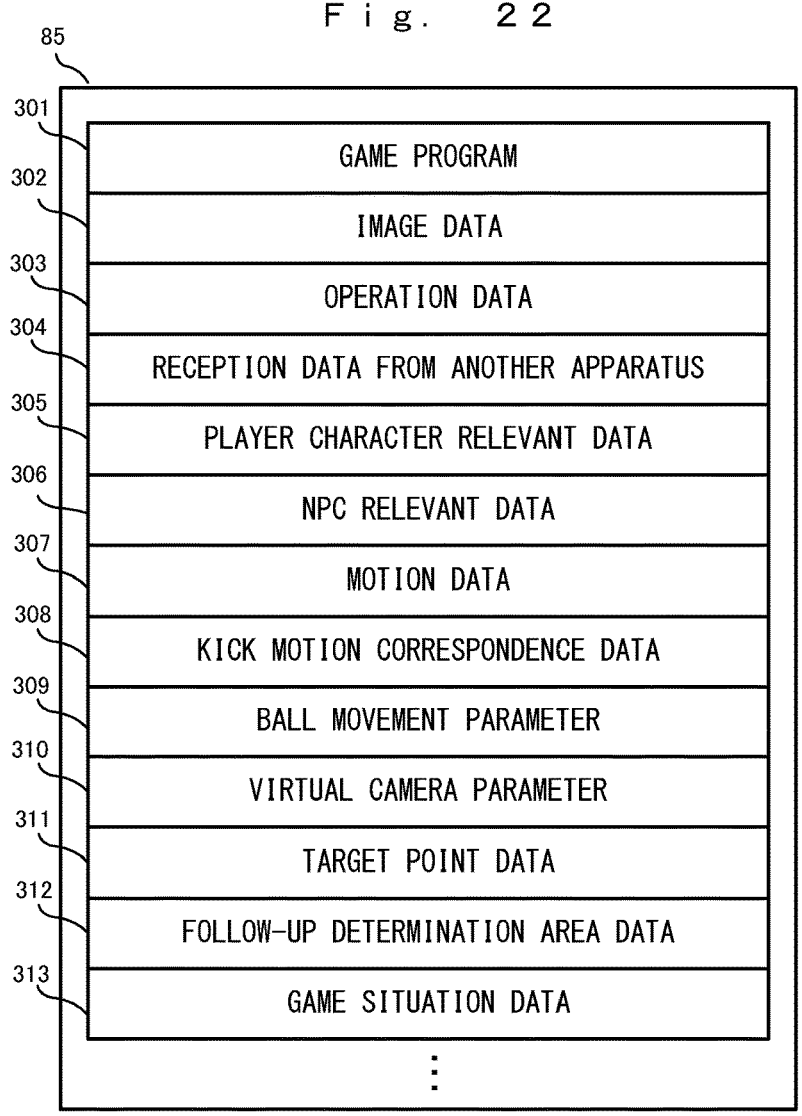
FIG. 22 shows a memory map showing a non-limiting example of various types of data stored in a DRAM 85.

First, various data to be used for the soccer game processing will be described. FIG. 22 is a memory map showing an example of various data stored in the DRAM 85 of the main body apparatus 2. The DRAM 85 of the main body apparatus 2 stores therein a game program 301, image data 302, operation data 303, reception data 304 received from another apparatus, player character relevant data 305, NPC relevant data 306, motion data 307, kick motion correspondence data 308, a ball movement parameter 309, a virtual camera parameter 310, target point data 311, follow-up determination area data 312, game situation data 313, and the like.

The game program 301 is a program for executing the soccer game processing.

The image data 302 is data of various images to be used in the soccer game processing. The image data 302 includes modeling data of a three-dimensional model, two-dimensional image data for background, and the like.

Figure 23:
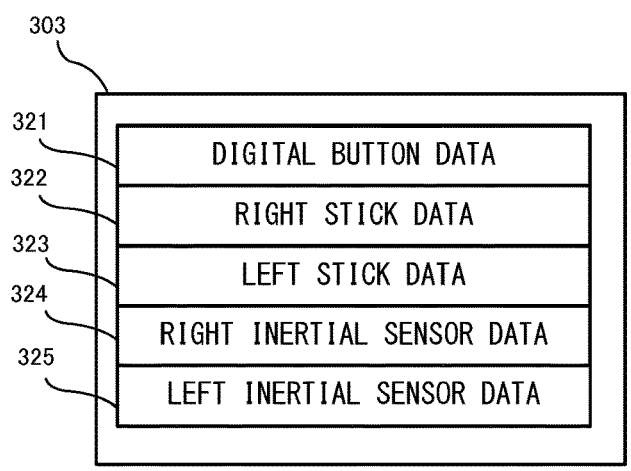
FIG. 23 shows a non-limiting example of a data structure of operation data 303.

The operation data 303 is obtained from the left controller 3 and the right controller 4, and indicates the content of a user's operation. FIG. 23 shows an example of a data structure of the operation data 303. The operation data 303 includes at least digital button data 321, right stick data 322, left stick data 323, right inertial sensor data 324, and left inertial sensor data 325. The digital button data 321 is data indicating pressed states of various buttons included in the controller. The right stick data 322 is data for indicating the content of an operation performed to the right stick 52. Specifically, two-dimensional data of x, y is included. The left stick data 323 is data for indicating the content of an operation performed to the left stick 32. The right inertial sensor data 324 is data indicating detection results of the inertial sensors such as the acceleration sensor 114 and the angular velocity sensor 115 of the right controller 4. Specifically, 3-axis acceleration data and 3-axis angular velocity data are included. The left inertial sensor data 325 is data indicating detection results of the inertial sensors such as the acceleration sensor 104 and the angular velocity sensor 105 of the left controller 3. In the following description, the right inertial sensor data 324 and the left inertial sensor data 325 may occasionally be referred to collectively as "inertial sensor data".

Referring back to FIG. 22, the reception data 304 from another apparatus is game data received from another game system 1, and is used for controlling the progress of the soccer game. Specifically, operation data 303 and the like of another game system 1 (indicating the operation content of the corresponding user) are received and stored in the reception data 304.

The player character relevant data 305 is data used for controlling the player character 201. FIG. 24 shows an example of a data structure of the player character relevant data 305. The player character relevant data 305 includes at least current position data 331, forward direction data 332, line-of-sight direction data 333, and a currently-executed action 334. The current position data 331 is data indicating the current position of the player character 201 in the virtual game space. The current position data 331 is indicated as three-dimensional coordinates in the virtual space coordinate system, for example. The forward direction data 332 is data indicating in which direction the front of the player character 201 faces in the virtual space coordinate system. The line-of-sight direction data 333 is data indicating a direction of the line of sight of the player character 201. In other words, the line-of-sight direction data 333 is data indicating the orientation of the head of the player character 201. The currently-executed action 334 is data indicating whether or not the player character 201 is currently executing an action of performing a predetermined motion based on the motion data 307 described later. If the player character 201 is currently executing such an action, the currently-executed action 334 indicates the content of the action (motion). In the exemplary embodiment, as examples of the predetermined action, "(plural kinds of) kick actions" and "heading action" are described. When none of these actions is currently executed, "non-action" is set in the currently-executed action 334. For example, when the player character 201 is just running, this running is regarded as "non-action".

Referring back to FIG. 22, the NPC relevant data 306 is data relating to characters (athletes) other than the player character 201. Although not shown in FIG. 22, the NPC relevant data 306 includes table data indicating which user takes charge of which athlete character in the game play through the network. Furthermore, data, similar to the player character relevant data 305, which is generated for each NPC based on the reception data 304 from another apparatus, is stored in the NPC relevant data 306.

The motion data 307 defines predetermined motions of the player character 201. Specifically, the motion data 307 is data defining the contents of motions regarding the kick actions (kick motions) and the content of a motion regarding the heading action (heading motion). In addition, in the exemplary embodiment, a plurality of kick motions according to the aforementioned swing direction are defined. FIG. 25 shows an example of a data structure of the motion data 307. The motion data 307 includes at least motion ID 341 and motion content 342. The motion ID 341 is an ID for uniquely identifying the corresponding motion. In the exemplary embodiment, each of the plurality of kick motions is represented in a form of "kick (number)". Regarding the heading motion, only one type of heading motion is used in the exemplary embodiment. In another embodiment, plural types of heading motions may be prepared. In the exemplary embodiment, when the player character 201 is currently executing a kick action or a heading action, the corresponding motion ID 341 is set in the currently-executed action 334.

Referring back to FIG. 22, the kick motion correspondence data 308 is data defining association of each kick motion with the corresponding swing direction. This data is used for determining one kick motion from among the plural types of kick motions on the basis of the swing direction. FIG. 26 shows an example of a data structure of the kick motion correspondence data 308. The kick motion correspondence data 308 includes motion ID 351 and corresponding swing direction 352. The motion ID 351 corresponds to the motion ID 341 of the motion data 307. In the exemplary embodiment, only motion IDs regarding the kick motions are included in the kick motion correspondence data 308. The corresponding swing direction 352 is data defining a swing direction that uses a kick motion indicated by the corresponding motion ID 351. Although described later in detail, in the exemplary embodiment, the swing direction is calculated as a two-dimensional vector. Therefore, as the content of the corresponding swing direction 352, for example, a direction using a two-dimensional vector or a predetermined range including a plurality of directions, is defined (e.g., a range from 40° to 50° in a diagonally upper-right direction is defined by a two-dimensional vector).

Referring back to FIG. 22, the ball movement parameter 309 is a parameter for controlling movement of the ball. The ball movement parameter 309 includes: data indicating the current position of the ball in the virtual game space; and parameters indicating the moving direction, the moving velocity, etc., of the ball from the current position. The content of the ball movement parameter 309 is changed as appropriate by collision with a predetermined athlete character object, and movement of the ball is controlled, for each frame, based on the parameter.

The virtual camera parameter 310 is data for designating the position, the imaging direction, etc., of the virtual camera (in the exemplary embodiment, the angle of view is fixed). The position and the direction of the of the virtual camera are controlled, for each frame, based on the parameter.

The target point data 311 is data indicating the target point 211 as shown in FIG. 14, etc. The follow-up determination area data 312 is data defining the size and the shape of the follow-up determination area 212 as shown in FIG. 14, etc. As an initial value of the follow-up determination area 212, a substantially square shape having a predetermined size is defined, for example.

The game situation data 313 is data for managing the progress of the soccer game. Specifically, the game situation data 313 includes data and the like indicating the scoring status of each team, the remaining game time, and the like. Determination as to whether the game has ended, and win/loss determination are performed based on the data.

In addition to the above data, various data required for the game processing are generated as appropriate, and are stored in the DRAM 85.

[Details of Processing Executed by Processor 81]

Figure 27:
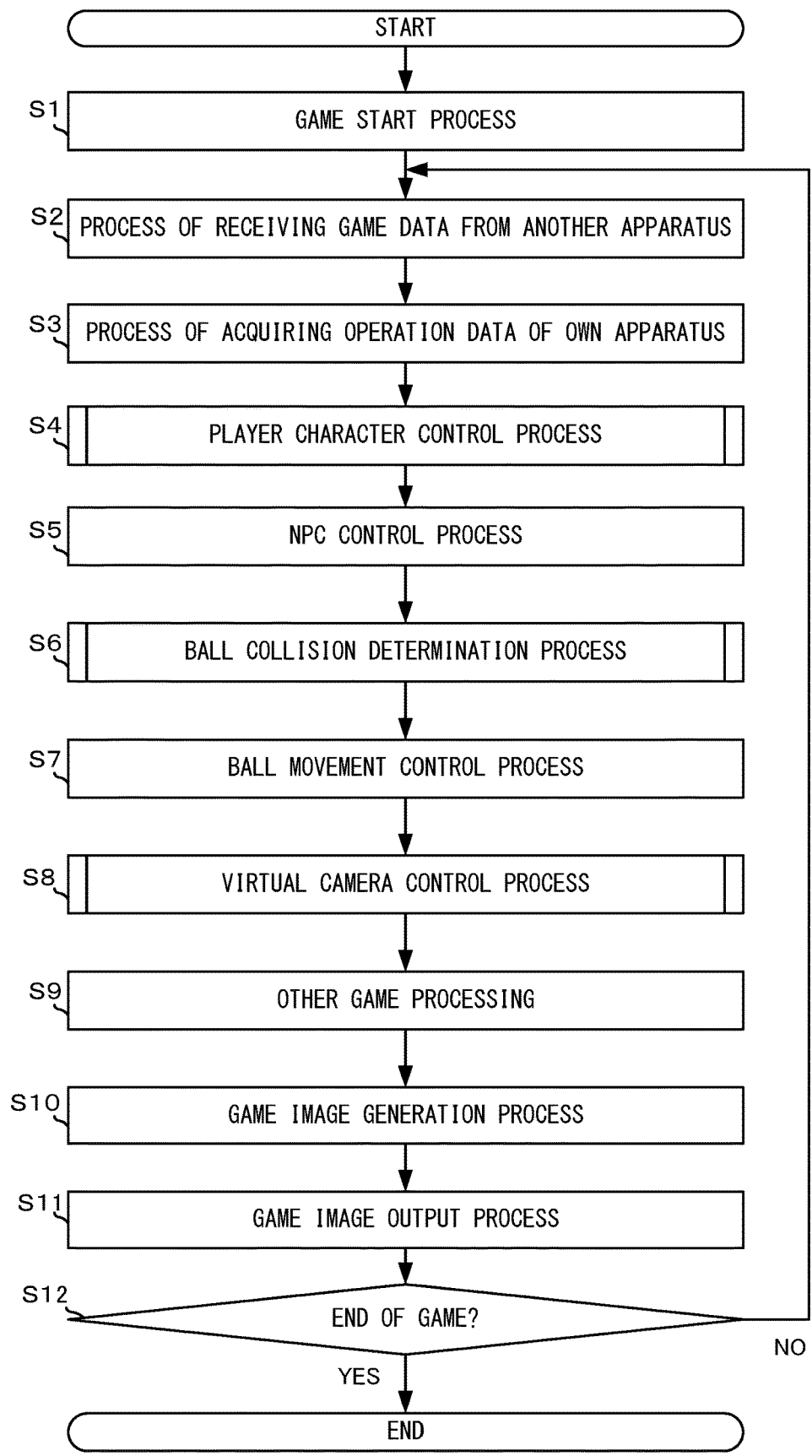
FIG. 27 is a non-limiting example of a flowchart showing details of game processing according to the exemplary embodiment.

Next, the soccer game processing according to the exemplary embodiment will be described in detail. FIG. 27 is a flowchart showing the soccer game processing in detail. In advance of the processing, preparations for starting the soccer game, such as network connection with other game systems 1, grouping of users into teams, position assignment, etc., have already been made. If the number of participants is insufficient, NPCs corresponding to the insufficient number of participants may be AI-controlled. In this case, the AI may be treated as "other users". A process loop of steps S2 to S12 shown in FIG. 27 is repeatedly executed for each frame.

The flowchart is merely an example of the processing. Therefore, the order of process steps may be changed as long as the same result is obtained. In addition, the values of variables and thresholds used in determination steps are also merely examples, and other values may be used according to need.

[Game Start Process]

In FIG. 27, first, in step S1, the processor 81 executes a game start process. Specifically, the processor 81 executes an initialization process for initializing various data to be used in the following processes. In addition, the processor 81 arranges the athlete character objects in the virtual game space. Furthermore, the processor 81 performs a representation process for game start, and thereafter, arranges the virtual camera at the aforementioned default position (behind the player character 201).

[Reception of Data from Another Game System]

Next, in step S2, the processor 81 receives game data related to another user from another game system 1, and stores the data as reception data 304 from another apparatus.

Next, in step S3, the processor 81 acquires operation data 303 (related to itself). In subsequent step S4, the processor 81 executes a player character control process for controlling the player character 201 on the basis of the operation data.

[Player Character Control Process]

Figure 28:
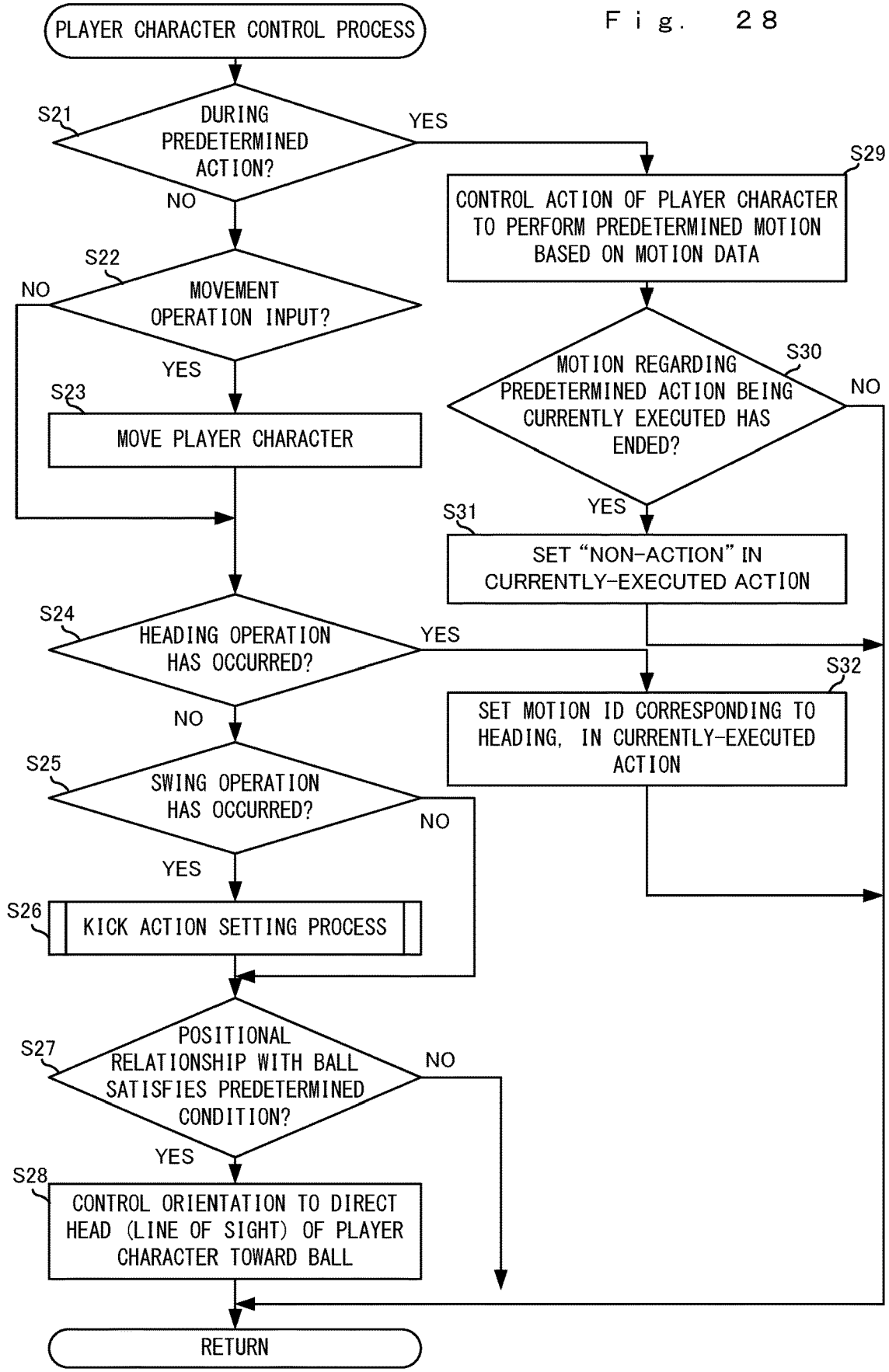
FIG. 28 is a non-limiting example of a flowchart showing details of a player character control process.

FIG. 28 is a flowchart showing the player character control process in detail. In FIG. 28, in step S21, the processor 81, with reference to the currently-executed action 334, determines whether or not the player character 201 is currently executing a predetermined action (in this example, a kick action or a heading action). More specifically, the processor 81 determines whether or not the content of the currently-executed action 334 is "non-action". When the content is not "non-action", the processor 81 determines that the player character 201 is currently executing a predetermined action. As a result of the determination, when the player character 201 is not currently executing a predetermined action (NO in step S21), in step S22, the processor 81 determines whether or not a movement operation input for the player character 201 has been made, on the basis of the operation data 303. Since the movement operation is an input operation to the left stick 32 in this example, the processor 81 performs this determination with reference to the left stick data 323. Here, a jump operation and a dash operation are also treated as movement operations. Therefore, whether or not the B-button 54 has been pressed (jump operation) or whether or not the ZL-button 39 has been pressed (dash operation) is also determined.

As a result of the determination, when a movement operation input has been made (YES in step S22), in step S23, the processor 81 updates the content of the current position data 331 on the basis of the content of the movement operation input, and moves the player character 201 on the basis of the updated current position data 331. Meanwhile, when a movement operation input has not been made (NO in step S22), the process in step S23 is skipped and the next process takes place.

Next, in step S24, the processor 81, with reference to the operation data 303 (inertial sensor data), determines whether or not a heading operation has been performed. Here, a supplemental description will be given for determination of the heading operation. In the exemplary embodiment, the heading operation is a user's operation of simultaneously swinging the right controller 4 and the left controller 3. In the exemplary embodiment, whether or not such a swing operation has occurred is determined as follows. That is, regarding the left controller 3, when an action of "downward swing" of a predetermined magnitude or more has been detected, it is determined that the swing operation regarding the simultaneous swing has occurred. Meanwhile, regarding the right controller 4, if an action of swinging the right controller 4 with a predetermined magnitude or more is detected regardless of the swing direction, it is determined that the swing operation regarding the simultaneous swing has occurred. The above determination is made in consideration of ease of the operation. Regarding the left controller 3, the left stick 32 is mainly operated. Meanwhile, unlike the left controller 3, the swing operation is a main operation for the right controller 4 because the swing operation is also required for a kick action described later. Therefore, for example, if a motion of "downward swing" similar to that of the left controller 3 is required of the right controller 4, there is a possibility that a hurdle for establishing the simultaneous swing is raised because the kick action described later is also performed by the swing operation. Therefore, the swing direction of the right controller 4 is not taken into consideration, and the simultaneous swing is established when a swing motion of a predetermined magnitude or more has occurred. Thus, ease of the heading operation is enhanced. Therefore, even a user's operation of swinging the left controller 3 downward while the user is swinging the right controller 4 can cause the heading operation to be established, which prevents the user from losing sudden chance of heading.

As a result of the determination, when a heading operation has occurred (YES in step S24), in step S32, the processor 81 sets the motion ID 341 corresponding to heading, in the currently-executed action 334. Thereafter, the processor 81 ends the player character control process.

Meanwhile, when a heading operation has not occurred (NO in step S24), in step S25, the processor 81 determines whether or not a swing operation (regarding the right controller 4) has occurred. Regarding the swing operation occurrence determination, in the exemplary embodiment, a start point in time and an end point in time of a swing operation are specified focusing on an xy component of an angular velocity, thereby determining whether or not a swing operation has occurred. Specifically, it is determined that a swing operation has started when the length of a vector regarding the xy component of the angular velocity (hereinafter referred to as "angular velocity xy vector") has exceeded a predetermined threshold. Thereafter, when the length becomes less than the predetermined threshold, the processor 81 determines that the swing operation has ended. With this end of the swing operation, the processor 81 determines that the swing operation has occurred (the swing operation has been done). In order to perform this determination, a history of inertial sensor data corresponding to several tens of frames in the past are stored as appropriate in the DRAM 85, although not shown in the figures. The processor 81 determines the start and the end of the swing operation on the basis of the history, thereby determining whether or not the swing operation has occurred. In the following description, a period from the start to the end of one swing operation is referred to as "swing period". Regarding the predetermined threshold used for determining the start and the end of the swing operation, the same value may be used for determining the start and the end, or different values may be used.

As a result of the determination in step S25, when a swing operation has not occurred (NO in step S25), the process is advanced to step S27 described later. Meanwhile, when a swing operation has occurred (YES in step S25), the processor 81 executes a kick action setting process in step S26.

[Kick Action Setting Process]

Figure 29:
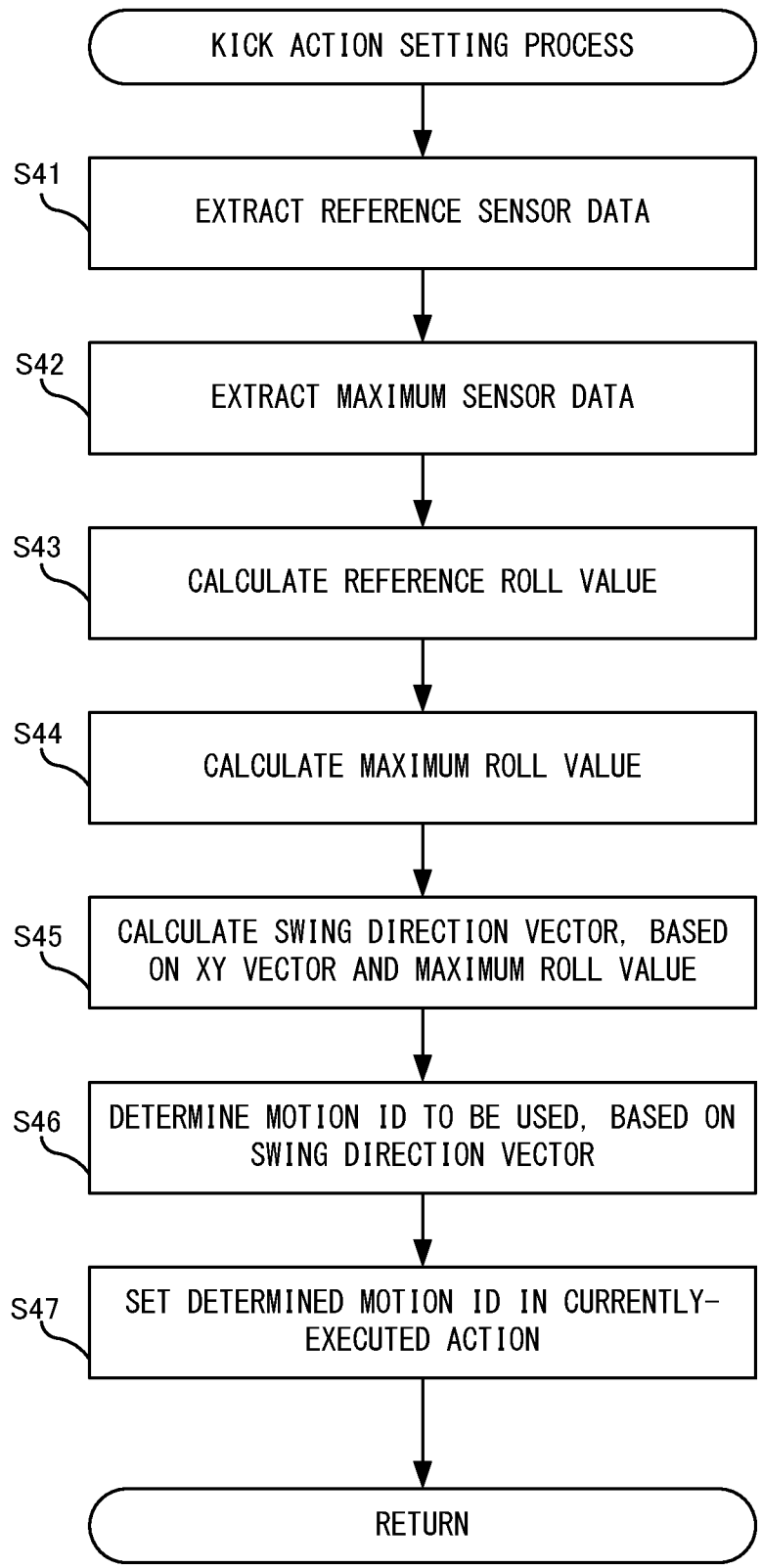
FIG. 29 is a non-limiting example of a flowchart showing details of a kick action setting process.

FIG. 29 is a flowchart showing the kick action setting process in detail. In this process, a swing direction is calculated as a two-dimensional vector, and a kick motion according to this swing direction is determined. Any method may be used for calculating the swing direction. In the exemplary embodiment, the swing direction is calculated through the following process. First, in step S41, the processor 81 extracts, from among a plurality of pieces of right inertial sensor data 324 within the swing period, right inertial sensor data 324 in which the orientation of the right controller 4 in the z-axis positive direction (see FIG. 5) is closest to the horizontal, and stores this data as "reference sensor data" in the DRAM 85.

Next, in step S42, the processor 81 extracts, from among the plurality of pieces of right inertial sensor data 324 within the swing period, right inertial sensor data 324 in which the length of the angular velocity xy vector is the largest, and stores this data as "maximum sensor data" in the DRAM 85.

Next, in step S43, the processor 81 calculates a tilt value (roll value), around the z axis, of the right controller 4 in the reference sensor data, and stores the value as "reference roll value" in the DRAM 85. Regarding the tilt value, for example, it is assumed that a state where the surface, of the right controller 4, having the right stick 52 faces vertically upward is 0, rotation to the right is expressed by a positive value, and rotation to the left is expressed by a negative value. Then, the tilt value may be calculated as a value within a range from +1 to −1.

When the reference roll value is calculated, in the exemplary embodiment, the reference roll value is corrected so as to be reduced as the z-axis positive direction of the right controller 4 is away from the horizontal (in the real space). Regarding the phrase "away from the horizontal", for example, it can be said that an orientation (of the right controller 4) at which the z-axis positive direction faces vertically upward or downward in the real space is an orientation most away from the horizontal. For example, if the right controller 4 is rotated around the z axis while the z-axis positive direction thereof faces vertically upward, this rotation is a roll rotation from the controller's perspective, but can be recognized as a yaw rotation from the perspective of the user's hand. Therefore, the above correction is made in order to make the rotation less likely to be recognized as a roll rotation, as the z-axis positive direction of the right controller 4 is closer to the vertically upward or downward direction.

Next, in step S44, on the basis of a time lag between the maximum sensor data and the reference sensor data and the angular velocities in these data, the processor 81 calculates an (relative) angle of change between these data. Furthermore, the processor 81 adds the angle of change to the reference roll value to calculate a roll value at the time of the maximum sensor data, and stores the value as "maximum roll value" in the DRAM 85.

Next, in step S45, the processor 81 rotates the angular velocity xy vector in the maximum sensor data by an amount of the maximum roll value to calculate a swing direction vector, and stores the swing direction vector in the DRAM 85.

The aforementioned swing direction calculation process can be regarded as a process of calculating a swing direction as a two-dimensional vector, in which a rotation, in consideration of a difference in orientation around the z axis caused by individual differences in the manner of holding the right controller 4 during the swing operation, is added to the angular velocity xy vector obtained when the momentum of the swing is maximum. For example, it is assumed that the user swings his/her hand to the upper right. In this case, although this swing is a swing in the upper-right direction from the user's perspective, there is a possibility that the value of the xy vector from the controller's perspective varies depending on a tilt around the z axis caused by the manner of holding the right controller 4 at that time, resulting in a possibility that the swing direction cannot be accurately determined. Therefore, in the above process, such a difference in the manner of holding the controller is corrected, and the swing direction is calculated as a two-dimensional vector.

Next, in step S46, the processor 81 determines a motion ID 341 of a kick motion according to the swing direction on the basis of the kick motion correspondence data 308 and the calculated swing direction.

Next, in step S47, the processor 81 sets the determined motion ID 341 in the currently-executed action 334. This allows the player character 201 to perform a kick action according to the swing direction. This is the end of the kick action setting process.

Referring back to FIG. 28, next, the processor 81 executes a process of controlling the line of sight of the player character 201. That is, in step S27, the processor 81 determines whether or not the positional relationship between the player character 201 and the ball satisfies a predetermined condition. This predetermined condition is, for example, a condition that the distance between the player character 201 and the ball is within a predetermined distance and that a difference in angle between the forward direction of the player character and the position of the ball is within a predetermined range. That is, the processor 81 determines whether or not the positional relationship satisfies a condition that the ball can be seen from the player character 201. As a result of the determination, when the predetermined condition is satisfied (YES in step S27), in step S28, the processor 81 sets the line-of-sight direction data 333 such that the head (line of sight) of the player character 201 is directed to the ball. Then, the processor 81 controls the orientation of the head of the player character 201 on the basis of the line-of-sight direction data 333. When the predetermined condition is not satisfied (NO in step S27), the process in step S28 is skipped. Then, the player character control process is ended.

Meanwhile, when the result of the determination in step S21 is that the player character 201 is currently executing a predetermined action (YES in step S21), in step S29, the processor 81 controls the action of the player character 201 so as to perform a predetermined motion corresponding to the motion ID 341 set in the currently-executed action 334. In the exemplary embodiment, if the forward direction of the player character 201 is not directed in the imaging direction of the virtual camera when the player character 201 starts a predetermined kick motion, the processor 81 makes the forward direction coincide with the imaging direction and then controls the player character 201 so as to start the predetermined kick motion. For example, if a swing operation (kick action) has been performed while the back side of the player character 201 faces the imaging direction of the virtual camera, the processor 81 turns the player character 201 such that the front side thereof faces the imaging direction and then causes the player character 201 to start the kick motion. As a result, the swing direction coincides with the kick direction. The reason for the above control is as follows. That is, the kick motion (kick direction) becomes a feedback indicating the result of the swing operation, Therefore, in order to correctly inform the user of the result of the swing operation, the direction of the player character 201 is made to coincide with the imaging direction of the virtual camera when the kick motion is started.

Next, in step S30, the processor 81 determines whether or not the motion regarding the action being currently executed has ended. As a result of the determination, when the motion has not yet ended (NO in step S30), the processor 81 ends the player character control process. In this case, control (reproduction) of the motion being currently executed is continued also in a process regarding the next frame. On the other hand, when the motion has ended (YES in step S30), in step S31, the processor 81 sets "non-action" in the currently-executed action 334. Then, the processor 81 ends the player character control process.

[NPC Control Process]

Referring back to FIG. 27, next, in step S5, the processor 81 executes an NPC control process. Specifically, the processor 81 calculates current position and direction of each NPC on the basis of reception data 304 from another apparatus, and stores the data as NPC relevant data 306. Furthermore, the processor 81 executes, for each NPC, the same process as the aforementioned player character control process on the basis of the NPC relevant data 306, thereby causing the NPC to move and perform a kick action or the like.

[Ball Collision Determination Process]

Figure 30:
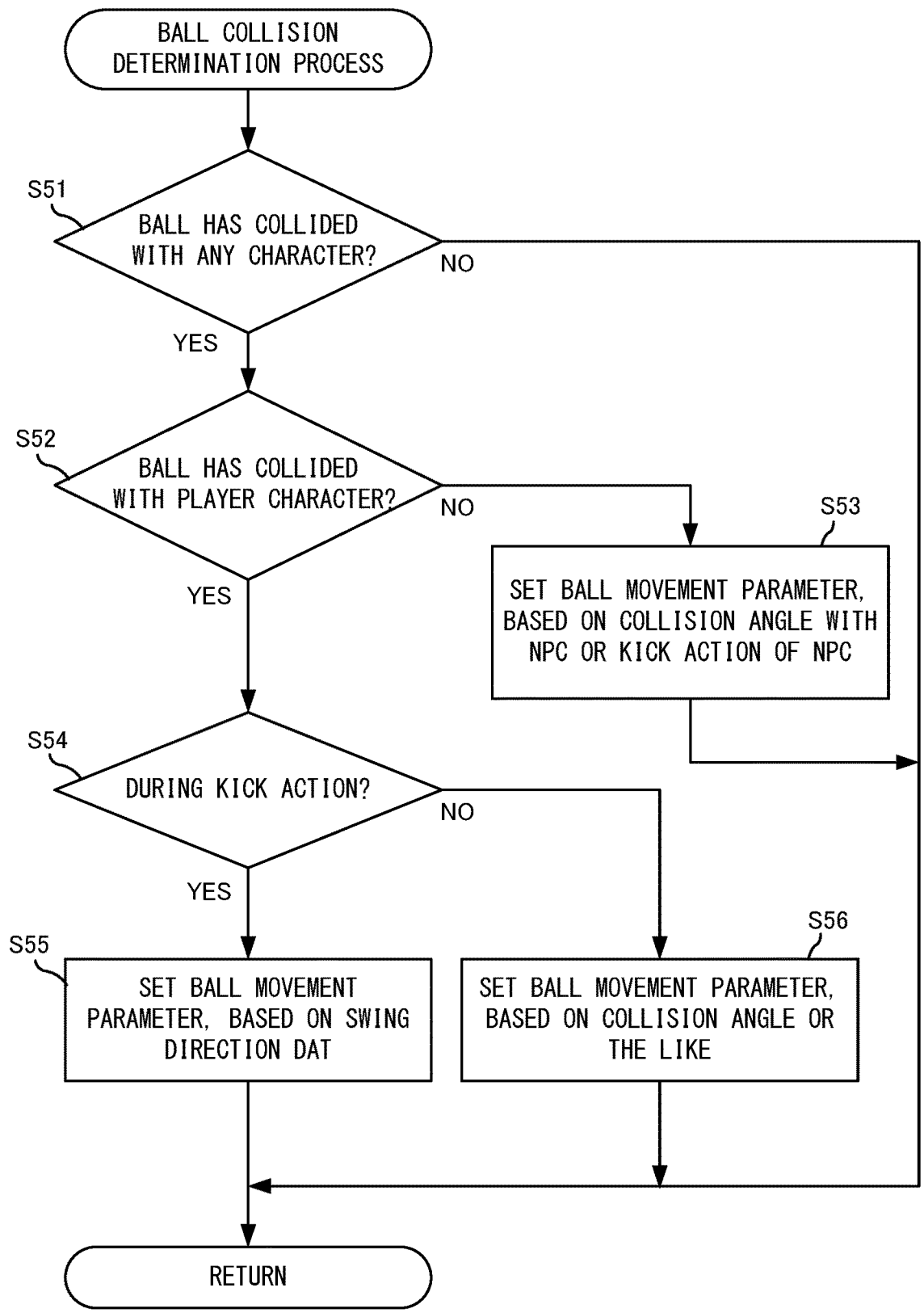
FIG. 30 is a non-limiting example of a flowchart showing details of a ball collision determination process.

Next, in step S6, the processor 81 executes a ball collision determination process. In this process, mainly, whether or not the ball collides with any athlete character object is determined, and when there is a collision, the ball movement parameter 309 is set as appropriate. FIG. 30 is a flowchart showing the ball collision determination process in detail. In FIG. 30, first, in step S51, the processor 81 determines whether or not the ball has collided with any athlete character object. When there is no collision (NO in step SM), the processor 81 ends the ball collision determination process.

On the other hand, when there is a collision (YES in step S51), in step S52, the processor 81 determines whether or not the athlete character object having collided with the ball is the player character 201. As a result of the determination, when the collision is not a collision with the player character 201 (NO in step S52), this means that the ball has collided with any NPC. In this case, in step S53, the processor 81 sets the ball movement parameter 309 on the basis of a collision angle and a collision speed between the ball and the NPC, and the content of a kick action of the NPC. Thereafter, the processor 81 ends the ball collision determination process.

On the other hand, when the ball has collided with the player character 201 (YES in step S52), in step S54, the processor 81 determines whether or not the player character 201 is currently executing a kick action, on the basis of the currently-executed action 334. As a result of the determination, when the player character 201 is currently executing a kick action (YES in step S54), in step S55, the processor 81 sets the ball movement parameter 309 on the basis of the swing direction vector. Specifically, the processor 81 calculates a kick direction on the basis of the swing direction vector and the imaging direction of the virtual camera at this time. That is, in an xy plane having a center point in the forward direction of imaging by the virtual camera, a direction obtained when a start point of the swing direction vector is aligned with the center point is the kick direction. Furthermore, the processor 81 determines whether the kick direction is directed in the y-axis positive direction (upward direction: upward swing operation) or is directed in the y-axis negative direction (downward direction: downward swing operation). When the kick direction is the former, the processor 81 sets the ball movement parameter 309 such that the ball has a high trajectory. When the kick direction is the latter, the processor 81 sets the ball movement parameter 309 such that the ball has a low trajectory. Furthermore, the processor 81 determines a moving direction (e.g., ejection angle) of the ball in the virtual game space, according to the kick direction. Furthermore, the processor 81 determines a moving velocity (e.g., ejection velocity) of the ball, according to the magnitude of the swing direction vector (vigorousness of the swing). Then, the processor 81 determines a target point and the like of the ball on the basis of the moving direction and the moving velocity, and sets the determined contents as the ball movement parameter 309. Moreover, the processor 81 may set the ball movement parameter 309 such that the ball is curved, on the basis of a twist (change in the roll value) of the right controller 4 in the swing period.

On the other hand, when the player character 201 is not currently executing a kick action (NO in step S54), in step S56, the processor 81 sets the content of the ball movement parameter 309 on the basis of the collision angle and the collision speed between the ball and the player character. For example, this case corresponds to dribble. Also, in the case of the heading action, the content of the ball movement parameter 309 is set through this process.

This is the end of the ball collision determination process.

[Ball Moving Process]

Referring back to FIG. 27, next, in step S7, the processor 81 executes a ball moving process on the basis of the content of the ball movement parameter 309.

[Virtual Camera Control Process]

Figure 31:
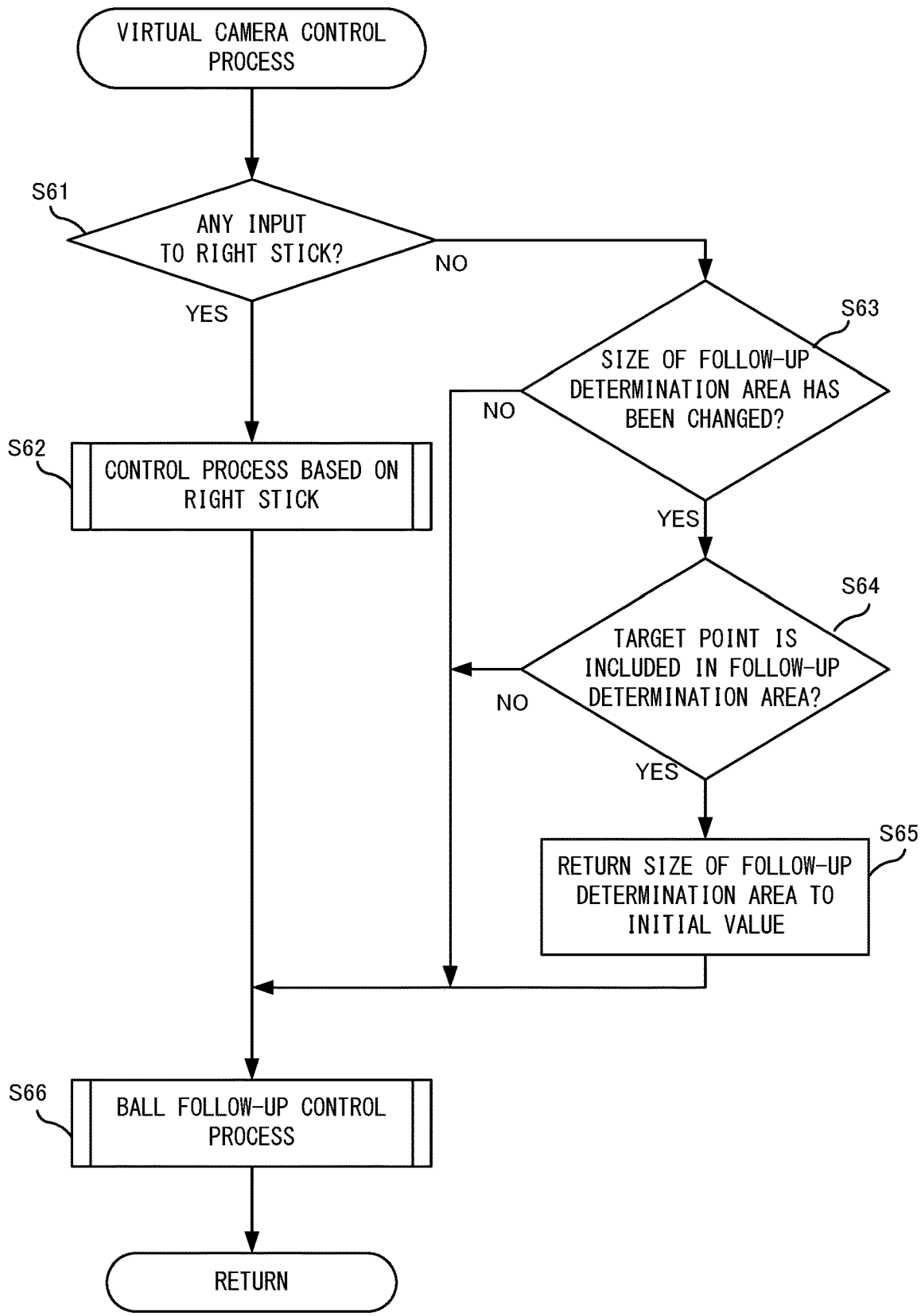
FIG. 31 is a non-limiting example of a flowchart showing details of a virtual camera control process.

Next, in step S8, the processor 81 executes a virtual camera control process. FIG. 31 is a flowchart showing the virtual camera control process in detail. First, in step S61, the processor 81, with reference to the operation data 303, determines whether or not an input to the right stick 52 has occurred. As a result of the determination, when an input to the right stick 52 has occurred (YES in step S61), in step S62, the processor 81 executes a control process based on the right stick 52.

Figure 32:
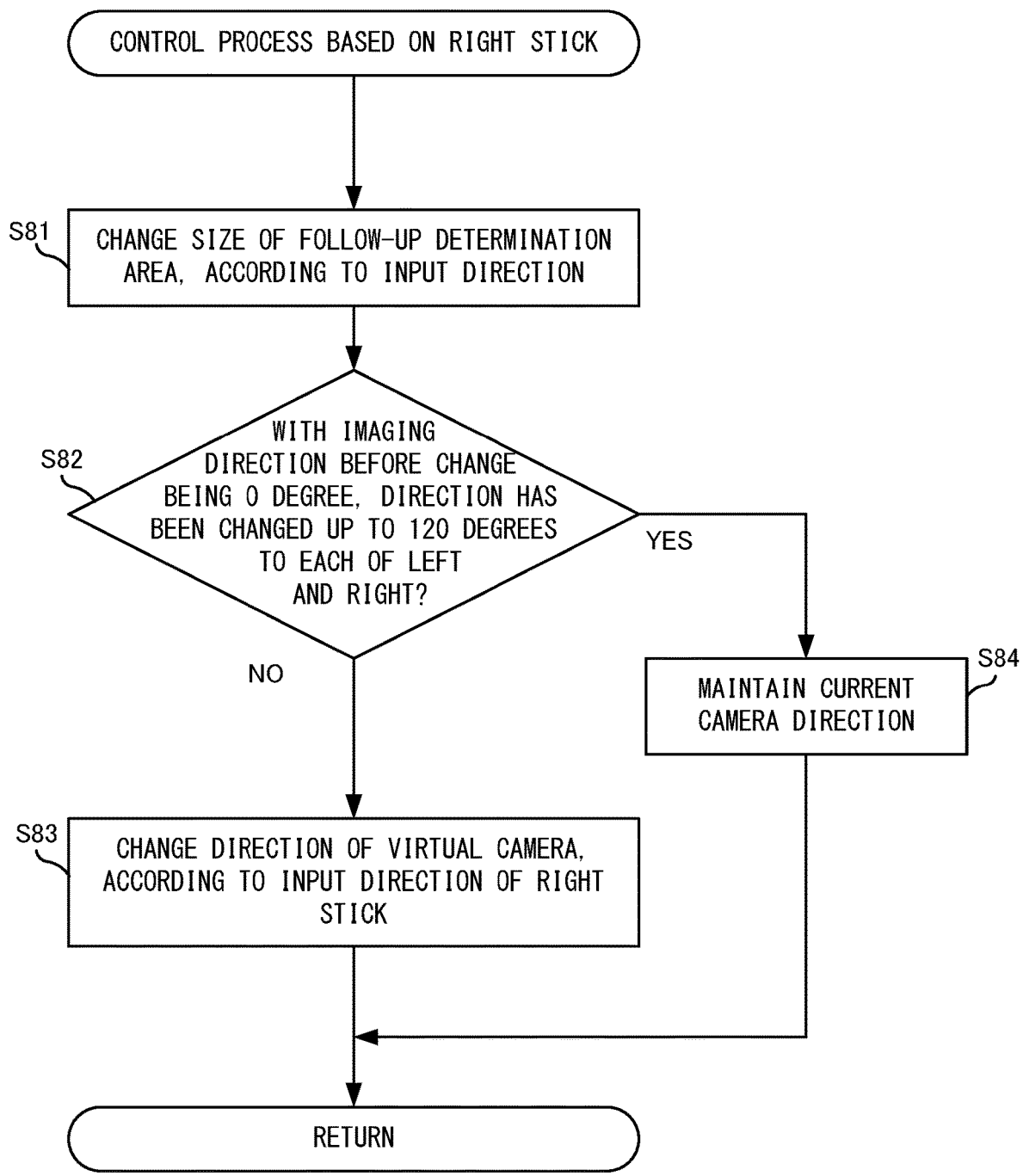
FIG. 32 is a non-limiting example of a flowchart showing details of a control process based on a right stick.

FIG. 32 is a flowchart showing the control process based on the right stick in detail. In FIG. 32, first, in step S81, the processor 81 changes the size of the follow-up determination area 212 from the size of the initial value, according to the input direction of the right stick 52. For example, when the input direction is to the right, the position of the right side of the follow-up determination area 212 of the initial value is moved rightward according to the magnitude of the input, thereby changing the size of the follow-up determination area 212. When the input direction is to the left, the position of the left side of the follow-up determination area 212 of the initial value is moved leftward according to the magnitude of the input, thereby changing the size of the follow-up determination area 212. When the input direction is diagonally to the upper right, for example, the upper side of the follow-up determination area 212 is moved upward while the right side thereof is moved rightward, thereby changing the size of the follow-up determination area 212. Then, the content of the follow-up determination area 212 having been changed is stored in the follow-up determination area data 312.

Next, in step S82, the processor 81 determines whether or not the direction of the virtual camera has been changed up to 120° to the left or the right according to the input direction, assuming that the imaging direction of the virtual camera before being changed by the right stick 52 is 0° as described with reference to FIG. 19. That is, the processor 81 determines whether or not the limit of the movable range, by the right stick 52, of the direction of the virtual camera has been reached. As a result of the determination, when change in the direction of the virtual camera has not yet reached 120° (NO in step S82), in step S83, the processor 81 updates the content of the virtual camera parameter 310 such that the direction of the virtual camera is changed according to the input direction of the right stick 52. Meanwhile, when change in the direction of the virtual camera has reached 120° (YES in step S82), in step S84, the processor 81 maintains the current direction of the virtual camera, i.e., does not change the direction of the virtual camera to exceed 120°.

Thereafter, the processor 81 ends the control process based on the right stick, and advances the process to step S65 described later.

Referring back to FIG. 31, when the result of the determination in step S61 is that an input to the right stick 52 has not occurred (NO in step S61), in step S63, the processor 81 determines whether or not the size of the follow-up determination area 212 has been changed from the initial value. As a result of the determination, when the size of the follow-up determination area has not been changed, i.e., when the size of the initial value is maintained (NO in step S63), the process is advanced to step S66 described later.

When the size of the follow-up determination area has been changed (YES in step S63), it is considered that the user has released his/her finger from the right stick 52, for example. In this case, in step S64, the processor 81 determines whether or not the target point 211 is included in the follow-up determination area 212 determined based on the follow-up determination area data 312 (this determination is made on the two-dimensional coordinate system). As a result of the determination, when the target point 211 is included in the follow-up determination area 212, (YES in step S64), in step S65, the processor 81 returns the size of the follow-up determination area 212 to the initial value, and thereafter advances the process to step S66. When the target point 211 is not included in the follow-up determination area 212 (NO in step S64), the process in step S65 is skipped.

Next, in step S66, the processor 81 executes a ball follow-up control process. In this process, a control of causing the direction of the virtual camera to follow the direction in which the ball is present, is performed.

Figure 33:
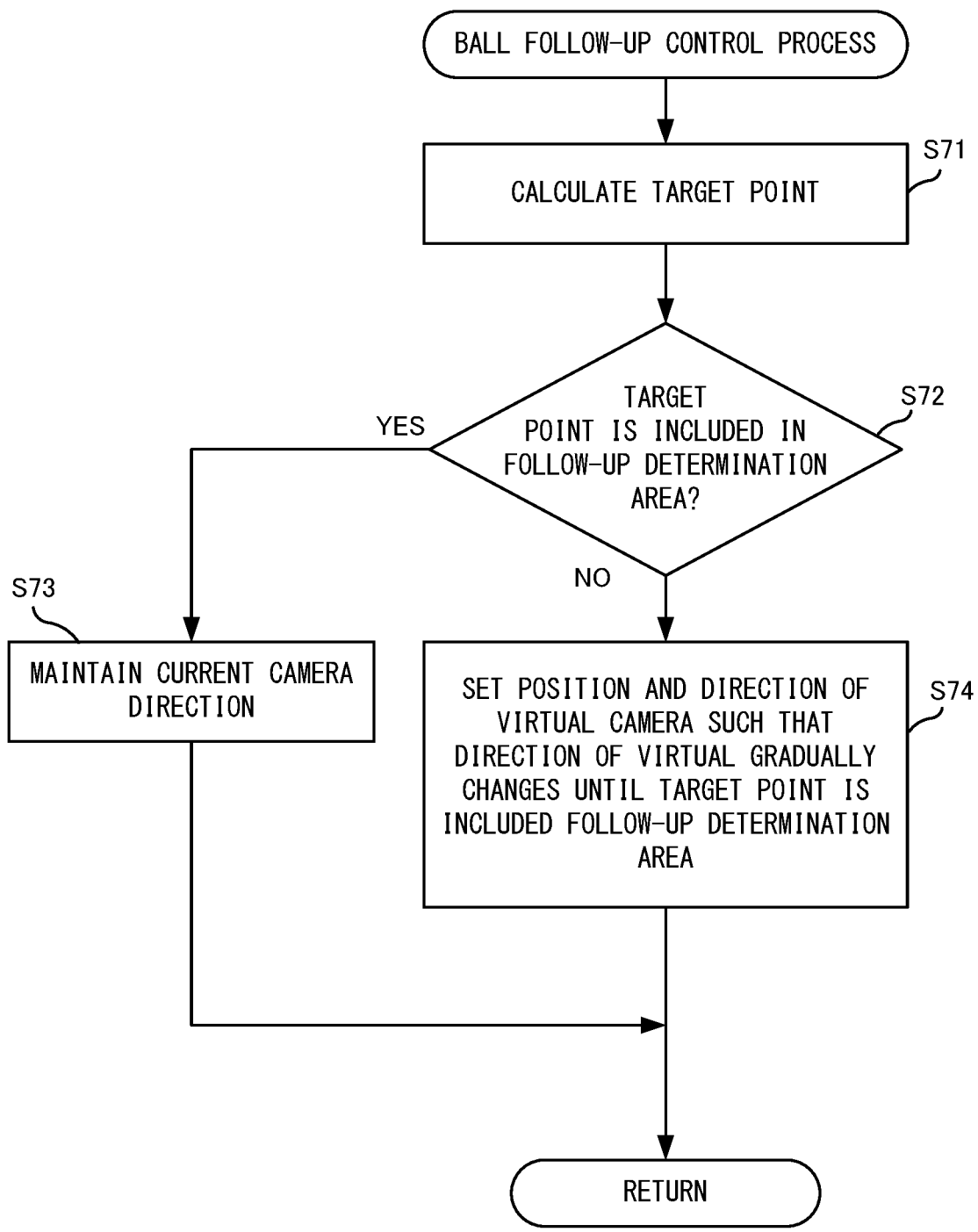
FIG. 33 is a non-limiting example of a flowchart showing details of a ball following process.

FIG. 33 is a flowchart showing the ball follow-up control process in detail. In FIG. 33, first, in the step S71, the processor 81 calculates a target point 211 as described with reference to FIG. 14, etc., and stores the target point 211 as target point data 311. At this time, as described with reference to FIGS. 16 to 18, if the height at which the ball is present is equal to or lower than the first height 213, the target point 211 is calculated such that the y-axis position of the target point 211 is not lower than then second height 214.

Next, in step S72, the processor 81 determines whether or not the target point 211 is included in the follow-up determination area 212. As a result of the determination, when the target point 211 is included in the follow-up determination area 212 (YES in step S72), in step S73, the processor 81 maintains the current direction of the virtual camera (e.g., the parameter of the direction of the virtual camera is updated with the current content).

When the target point is not included in the follow-up determination area 212 (NO in step S72), in step S74, the processor 81 sets the position and the direction of the virtual camera such that the direction of the virtual camera is gradually changed until the target point 211 is included in the follow-up determination area 212. The position of the virtual camera is set such that the virtual camera has a movement trajectory that constantly moves around the player character 201, so that the player character 201 is always displayed in the game screen. The rotation speed of the direction of the virtual camera is set such that the greater the distance between the target point 211 and the follow-up determination area 212 is, the higher the approaching speed is. This provides the game screen in which the player character 201 and the ball are always displayed (included in the screen).

This is the end of the ball follow-up control process.

Referring back to FIG. 31, when the ball follow-up control process has ended, the processor 81 ends the virtual camera control process.

[Other Various Types of Game Processing]

Referring back to FIG. 27, next, in step S9, the processor 81 executes another game processing. Specifically, the processor 81 performs a process of determining whether or not the position of the ball is inside the goal object, and giving a point to a team that has made a goal if the ball is inside the goal object. In addition, for example, a sound control process for controlling BGM, a sound effect, etc., is also executed as appropriate.

[Game Screen Generating and Outputting Process]

Next, in step S10, the processor 81 causes the virtual camera to capture the virtual game space in which the aforementioned game processing is reflected. Then, the processor 81 generates a game image by subjecting the captured image to predetermined processing. The content of the processing is, for example, adding various effect images such as the swing effect image 202, an image indicating the score and/or the remaining time, a mini map image, etc. The swing effect image 202 may be generated based on the kick direction.

Next, in step S11, the processor 81 outputs the game image.

[Determination of Game End]

Next, in step S12, the processor 81 determines whether or not the game has ended because the time limit has expired (game time has elapsed). When the game has not yet ended (NO in step S12), the processor 81 returns to step S2 and repeats the subsequent steps. When the game has ended (YES in step S12), the processor 81 performs a predetermined game end representation (e.g., display of a win/loss result), and ends the soccer game processing.

This is the end of the specific description of the soccer game processing according to the exemplary embodiment.

As described above, in the exemplary embodiment, the soccer game is made playable through the operation method in which the player character 201 is moved through a direction input operation performed to the left stick 32, and the player character 201 is caused to perform a kick action through an operation of swinging the right controller 4. Therefore, the user can intuitively designate the direction of a kick (swing) while moving the player character 201. Thus, the soccer game having excellent operability can be provided. Moreover, the soccer game is playable by multiple users such that each of participant users takes charge of one of the athlete players of the teams. Therefore, the game allows the user to experience as if he/she, as a member of a team, moves in the field and kicks the ball at his/her own discretion. This provides the user with a feeling as if he/she is actually playing soccer.

In the exemplary embodiment, a swing direction (kick direction) is calculated as a two-dimensional vector. That is, a kick direction can be designated with respect to 360-degree directions on the xy plane. Therefore, the user can cause the player character 201 to perform a kick action not only by an upward swing operation but also by a downward swing operation.

Modifications

In the exemplary embodiment, a kick direction can be defined within a range of 360°. In another embodiment, a kick direction may be defined within a range of 180°. That is, for example, a kick action caused by a downward swing operation may not necessarily be adopted.

In another embodiment, a swing direction may be calculated as an angle instead of a two-dimensional vector. For example, a swing direction may be calculated as an angle, with the y-axis positive direction on the xy plane being 0°.

In the above description, since the soccer game is adopted as an example of the sport game, the player character swings a leg. In another embodiment, according to the content of the sport game, the player character 201 may swing, for example, an arm (e.g., tennis game) instead of a leg.

The aforementioned operation method is applicable not only to a case where the above soccer game is played by multiple players but also to a case where the soccer game is played by a single player. For example, in the above soccer game, all the NPCs other than the player character 201 may be AI-controlled.

In the exemplary embodiment, an analog stick is used as a direction input device. However, the direction input device may not necessarily be an analog stick. The aforementioned processing is also applicable to a case where an analog input type direction input device that is at a predetermined neutral position when there is no input, is used. For example, the processing is also applicable to a slide pad.

In the above embodiment, a case where a series of processes regarding soccer game processing (except for transmission/reception processing using the network) are performed in the single main body apparatus 2, has been described. However, in another embodiment, the above series of processes may be performed in an information processing system that includes a plurality of information processing apparatuses. For example, in an information processing system that includes a terminal side apparatus and a server side apparatus capable of communicating with the terminal side apparatus via a network, a part of the series of processes may be performed by the server side apparatus. Alternatively, in an information processing system that includes a terminal side apparatus and a server side apparatus capable of communicating with the terminal side apparatus via a network, a main process of the series of the processes may be performed by the server side apparatus, and a part of the series of the processes may be performed by the terminal side apparatus. Still alternatively, in the information processing system, a server side system may include a plurality of information processing apparatuses, and a process to be performed in the server side system may be divided and performed by the plurality of information processing apparatuses. In addition, a so-called cloud gaming configuration may be adopted. For example, the main body apparatus 2 may be configured to send operation data indicating a user's operation to a predetermined server, and the server may be configured to execute various kinds of game processing and stream the execution results as video/audio to the main body apparatus 2.

While the exemplary embodiments have been described in detail, the foregoing description is in all aspects illustrative and not restrictive. It is to be understood that numerous other modifications and variations can be devised without departing from the scope of the exemplary embodiments.

What is claimed is:

1. A sport game system comprising:
   an operation device; and
   an information processing apparatus including a processor and a memory coupled to the processor, wherein
   the operation device includes:
      a first direction input device,
      a first inertial sensor, and
      a data transmission section configured to transmit operation data to the information processing apparatus, the operation data including at least first direction data based on an output of the first direction input device and first inertial data based on an output of the first inertial sensor, and
   the information processing apparatus is configured to:
      move a player character object in a virtual space on the basis of the first direction data,
      control a position of a virtual camera in the virtual space on the basis of a position of the player character object,
      determine, on the basis of the first inertial data, a swing direction in which the operation device has been swung,
      cause the player character object to perform a swing action of swinging in a direction according to the determined swing direction,
      cause the moving object to move in the virtual space on the basis of collision determination between the swing action and a moving object, thereby controlling a sport game that uses the moving object, and
      set a direction of the virtual camera on the basis of a position of the moving object, and arrange the virtual camera at a position such that the player character object is included in a field of view of the virtual camera.

2. The sport game system according to claim 1, wherein the moving object is a ball object.

3. The sport game system according to claim 2, wherein the swing action is a kick action of swinging a leg of the player character object, and
the sport game is a soccer game in which a point is given when the ball object is kicked into a goal.

4. The sport game system according to claim 3, wherein the information processing apparatus is further configured to:
   determine the swing direction as a two-dimensional direction, and
   cause the player character object to perform, as the kick action, an action of kicking in a direction according to the two-dimensional swing direction.

5. The sport game system according to claim 1, wherein the information processing apparatus is further configured to:
   perform communication through the Internet or wireless and direct communication, with another information processing apparatus, and
   control the player character together with another player character controlled in the other information processing apparatus, to control the sport game played by multiple players.

6. The sport game system according to claim 1, wherein the operation device includes a first operation device and a second operation device,
the first operation device includes the first direction input device, and
the second operation device includes the first inertial sensor.

7. The sport game system according to claim 6, wherein the second operation device further includes a second direction input device,
the operation data further includes second direction data based on an output of the second direction input device, and
the information processing apparatus is configured to set the direction of the virtual camera on the basis of the position of the moving object and the second direction data.

8. The sport game system according to claim 7, wherein the information processing apparatus is configured to set the direction of the virtual camera, on the basis of the second direction data, within a predetermined range including a direction toward the moving object in the virtual space.

9. The sport game system according to claim 6, wherein the first operation device further includes a second inertial sensor, the operation data further includes second inertial data based on an output of the second inertial sensor, and the information processing apparatus is further configured to:
  determine whether or not the first operation device and the second operation device have been swung at substantially the same timing, on the basis of the first inertial data and the second inertial data, and
  upon determining that the operation devices have been swung at substantially the same timing, cause the player character object to perform an action different from the swing action.

10. A non-transitory computer-readable storage medium having stored therein a sport game program to be executed by a computer of an information processing apparatus, the program causing the computer to provide execution comprising:
  acquiring, on the basis of operation data transmitted from an operation device including a first direction input device and a first inertial sensor, first direction data based on an output of the first direction input device and first inertial data based on an output of the first inertial sensor;
  moving a player character object in a virtual space on the basis of the first direction data;
  controlling a position of a virtual camera in the virtual space on the basis of a position of the player character object;
  determining, on the basis of the first inertial data, a swing direction in which the operation device has been swung;
  causing the player character object to perform a swing action of swinging in a direction according to the determined swing direction;
  causing the moving object to move in the virtual space on the basis of collision determination between the swing action and the moving object, thereby controlling a sport game using the moving object; and
  setting a direction of the virtual camera on the basis of a position of the moving object, and arranging the virtual camera at a position such that the player character object is included in a field of view of the virtual camera.

11. The storage medium according to claim 10, wherein the moving object is a ball object.

12. The storage medium according to claim 11, wherein the swing action is a kick action of swinging a leg of the player character object, and
the sport game is a soccer game in which a point is given when the ball object is kicked into a goal.

13. The storage medium according to claim 12, wherein the program further causes the computer to provide execution comprising:
  determining the swing direction as a two-dimensional direction, and
  causing the player character object to perform, as the kick action, an action of kicking in a direction according to the two-dimensional swing direction.

14. The storage medium according to claim 10, wherein the program further causes the computer to provide execution comprising:
  performing communication through the Internet or wireless and direct communication, with another information processing apparatus, and
  controlling the player character together with another player character controlled in the other information processing apparatus, to control the sport game played by multiple players.

15. The storage medium according to claim 10, wherein the operation device includes a first operation device and a second operation device, the first operation device includes the first direction input device, and the second operation device includes the first inertial sensor and a second direction input device,
the operation data further includes second direction data based on an output of the second direction input device, and
the program further causes the computer to provide execution comprising setting the direction of the virtual camera on the basis of the position of the moving object and the second direction data.

16. The storage medium according to claim 15, wherein the program further causes the computer to provide execution comprising setting the direction of the virtual camera, on the basis of the second direction data, within a predetermined range including a direction toward the moving object in the virtual space.

17. The storage medium according to claim 15, wherein the first operation device further includes a second inertial sensor,
the operation data further includes second inertial data based on an output of the second inertial sensor, and
the program further causes the computer to provide execution comprising:
  determining whether or not the first operation device and the second operation device have been swung at substantially the same timing, on the basis of the first inertial data and the second inertial data, and
  upon determining that the operation devices have been swung at substantially the same timing, causing the player character object to perform an action different from the swing action.

18. A sport game apparatus comprising:
an operation device; and
a processor and a memory coupled to the processor, wherein
the operation device includes:
  a first direction input device,
  a first inertial sensor, and
  a data transmission section configured to transmit operation data to the information processing apparatus, the operation data including at least first direction data based on an output of the first direction input device and first inertial data based on an output of the first inertial sensor, and
the processor is configured to control the sport game apparatus to at least:
  move a player character object in a virtual space on the basis of the first direction data,
  control a position of a virtual camera in the virtual space on the basis of a position of the player character object,
  determine, on the basis of the first inertial data, a swing direction in which the operation device has been swung, cause the player character object to perform a swing action of swinging in a direction according to the determined swing direction, cause the moving object to move in the virtual space on the basis of collision determination between the swing action and a moving object, thereby controlling a sport game that uses the moving object, and set a direction of the virtual camera on the basis of a position of the moving object, and arrange the virtual camera at a position such that the player character object is included in a field of view of the virtual camera.

19. The sport game apparatus according to claim 18, wherein the moving object is a ball object.

20. The sport game apparatus according to claim 19, wherein
the swing action is a kick action of swinging a leg of the player character object, and
the sport game is a soccer game in which a point is given when the ball object is kicked into a goal.

21. The sport game apparatus according to claim 20, wherein
the processor further causes the sport game apparatus to:
determine the swing direction as a two-dimensional direction, and
cause the player character object to perform, as the kick action, an action of kicking in a direction according to the two-dimensional swing direction.

22. The sport game apparatus according to claim 18, wherein
the processor further causes the sport game apparatus to:
perform communication through the Internet or wireless and direct communication, with another information processing apparatus, and
control the player character together with another player character controlled in the other information processing apparatus, to control the sport game played by multiple players.

23. A sport game processing method executed by a computer that controls an information processing apparatus, the method comprising:
acquiring, on the basis of operation data transmitted from an operation device including a first direction input device and a first inertial sensor, first direction data based on an output of the first direction input device and first inertial data based on an output of the first inertial sensor;

moving a player character object in a virtual space on the basis of the first direction data;
controlling a position of a virtual camera in the virtual space on the basis of a position of the player character object;
determining, on the basis of the first inertial data, a swing direction in which the operation device has been swung;
causing the player character object to perform a swing action of swinging in a direction according to the determined swing direction;
causing the moving object to move in the virtual space on the basis of collision determination between the swing action and the moving object, thereby controlling a sport game using the moving object; and
setting a direction of the virtual camera on the basis of a position of the moving object, and arranging the virtual camera at a position such that the player character object is included in a field of view of the virtual camera.

24. The sport game processing method according to claim 23, wherein the moving object is a ball object.

25. The sport game processing method according to claim 24, wherein
the swing action is a kick action of swinging a leg of the player character object, and
the sport game is a soccer game in which a point is given when the ball object is kicked into a goal.

26. The sport game processing method according to claim 25, further comprising:
determining the swing direction as a two-dimensional direction, and
causing the player character object to perform, as the kick action, an action of kicking in a direction according to the two-dimensional swing direction.

27. The sport game processing method according to claim 23, further comprising:
performing communication through the Internet or wireless and direct communication, with another information processing apparatus, and
controlling the player character together with another player character controlled in the other information processing apparatus, to control the sport game played by multiple players.

* * * * *